(12) United States Patent
Klinker et al.

(10) Patent No.: US 7,269,157 B2
(45) Date of Patent: Sep. 11, 2007

(54) SYSTEM AND METHOD TO ASSURE NETWORK SERVICE LEVELS WITH INTELLIGENT ROUTING

(75) Inventors: Eric Klinker, San Jose, CA (US); Jeremy Johnson, Oakland, CA (US); Allwyn Sequiera, Saratoga, CA (US)

(73) Assignee: Internap Network Services Corporation, Atlanta, GA (US)

( * ) Notice: Subject to any disclaimer, the term of this patent is extended or adjusted under 35 U.S.C. 154(b) by 126 days.

(21) Appl. No.: 09/833,219

(22) Filed: Apr. 10, 2001

(65) Prior Publication Data

US 2002/0145981 A1  Oct. 10, 2002

(51) Int. Cl.
*H04L 12/26* (2006.01)

(52) U.S. Cl. .................. 370/351; 370/228; 370/238

(58) Field of Classification Search ........... 370/228, 370/248, 351, 395.3, 395.31, 389, 392, 231, 370/232, 284, 237, 238; 706/19; 709/238–242
See application file for complete search history.

(56) References Cited

U.S. PATENT DOCUMENTS

| | | | |
|---|---|---|---|
| 5,724,513 A | 3/1998 | Ben-Nun et al. | |
| 5,781,534 A * | 7/1998 | Perlman et al. | 370/248 |
| 5,870,561 A | 2/1999 | Jarvis et al. | |
| 5,898,668 A | 4/1999 | Shaffer | |
| 5,933,425 A | 8/1999 | Iwata | |
| 5,953,312 A * | 9/1999 | Crawley et al. | 370/218 |
| 6,047,326 A | 4/2000 | Kilkki | |
| 6,047,331 A * | 4/2000 | Medard et al. | 709/239 |
| 6,055,571 A | 4/2000 | Fulp et al. | |
| 6,064,677 A | 5/2000 | Kappler et al. | |
| 6,097,699 A | 8/2000 | Chen et al. | |
| 6,130,890 A | 10/2000 | Leinwand et al. | |
| 6,154,778 A | 11/2000 | Koistinen et al. | |
| 6,181,679 B1 | 1/2001 | Ashton et al. | |
| 6,185,635 B1 | 2/2001 | O'Loughlin et al. | |
| 6,226,751 B1 | 5/2001 | Arrow et al. | |
| 6,249,801 B1 | 6/2001 | Zisapel et al. | |
| 6,252,848 B1 | 6/2001 | Skirmont | |
| 6,256,314 B1 | 7/2001 | Rodrig et al. | |
| 6,262,976 B1 | 7/2001 | McNamara | |
| 6,275,470 B1 | 8/2001 | Ricciulli | |

(Continued)

OTHER PUBLICATIONS

Labovitz et al., "Delayed Internet Routing Convergence", IEEE, Jun. 2001, pp. 293-306, vol. 9, No. 3.

*Primary Examiner*—Doris H. To
*Assistant Examiner*—Saba Tsegaye
(74) *Attorney, Agent, or Firm*—Kilpatrick Stockton LLP

(57) ABSTRACT

A method and system for maintaining a traffic service level for data communicated by a computer network having a source. The computer network is connected to at least one of many networks, where each of the many networks includes a number of paths for transporting the data communicated to a destination. In one embodiment of the method, the traffic service level associated with one of the paths between the source and the destination is monitored. Then, it is determined whether the traffic service level associated with that path meets one or more performance metrics. If a flow of data communicated over the monitored path fails to meet at least one of the performance metrics, then a service level violation is indicated. Upon such an indication, an alternate path is selected to resolve the service level violation.

18 Claims, 23 Drawing Sheets

U.S. PATENT DOCUMENTS

| | | |
|---|---|---|
| 6,292,464 B1 | 9/2001 | Elahmadi et al. |
| 6,363,053 B1 * | 3/2002 | Schuster et al. ............ 370/230 |
| 6,363,056 B1 * | 3/2002 | Beigi et al. ................. 370/252 |
| 6,374,300 B2 | 4/2002 | Masters |
| 6,393,486 B1 | 5/2002 | Pelavin et al. |
| 6,400,681 B1 * | 6/2002 | Bertin et al. ................ 370/218 |
| 6,404,769 B1 | 6/2002 | Kapoor |
| 6,405,219 B2 | 6/2002 | Saether et al. |
| 6,466,984 B1 | 10/2002 | Naveh et al. |
| 6,574,195 B2 | 6/2003 | Roberts |
| 6,658,457 B2 | 12/2003 | Nishikawa et al. |
| 6,665,702 B1 | 12/2003 | Zisapel et al. |
| 6,678,248 B1 | 1/2004 | Haddock et al. |
| 6,690,649 B1 | 2/2004 | Shimada |
| 6,728,265 B1 * | 4/2004 | Yavatkar et al. ............ 370/468 |
| 6,785,237 B1 * | 8/2004 | Sufleta ....................... 370/236 |
| 6,801,502 B1 | 10/2004 | Rexford et al. |
| 6,831,893 B1 * | 12/2004 | Ben Nun et al. ........... 370/235 |
| 6,842,783 B1 | 1/2005 | Boivie et al. |
| 6,857,025 B1 | 2/2005 | Maruyama et al. |
| 6,947,379 B1 | 9/2005 | Gleichauf et al. |
| 6,954,431 B2 | 10/2005 | Roberts |
| 2001/0021176 A1 | 9/2001 | Mimura et al. |
| 2001/0037387 A1 | 11/2001 | Gilde et al. |
| 2002/0010765 A1 * | 1/2002 | Border ....................... 709/220 |
| 2002/0010792 A1 | 1/2002 | Border et al. |
| 2002/0040400 A1 | 4/2002 | Masters |
| 2002/0057699 A1 | 5/2002 | Roberts |
| 2002/0075813 A1 | 6/2002 | Baldanado et al. |
| 2002/0078223 A1 | 6/2002 | Baldonado et al. |
| 2002/0103846 A1 | 8/2002 | Zisapel et al. |
| 2002/0105909 A1 | 8/2002 | Flanagan et al. |
| 2002/0105911 A1 | 8/2002 | Pruthi et al. |
| 2002/0110084 A1 | 8/2002 | Butt et al. |
| 2002/0141378 A1 | 10/2002 | Bays et al. |
| 2002/0145981 A1 | 10/2002 | Klinker et al. |
| 2002/0163884 A1 | 11/2002 | Peles et al. |
| 2002/0184393 A1 | 12/2002 | Leddy et al. |
| 2002/0186661 A1 | 12/2002 | Santiago et al. |
| 2003/0002443 A1 | 1/2003 | Basso et al. |
| 2003/0012145 A1 | 1/2003 | Bragg |
| 2003/0016627 A1 | 1/2003 | MeLampy et al. |
| 2003/0074449 A1 | 4/2003 | Smith et al. |
| 2003/0079005 A1 | 4/2003 | Myers et al. |
| 2003/0088671 A1 | 5/2003 | Klinker et al. |
| 2003/0118029 A1 | 6/2003 | Maher et al. |
| 2004/0196787 A1 | 10/2004 | Wang et al. |
| 2004/0258226 A1 * | 12/2004 | Host ..................... 379/106.01 |

* cited by examiner

SYSTEM AND METHOD TO ASSURE NETWORK SERVICE LEVELS WITH INTELLIGENT ROUTING

BACKGROUND OF THE INVENTION

The present invention relates to intelligent routing of data over networked communication systems, and more specifically to intelligent routing of Internet networks.

The Internet is increasingly being used as a method of transport for communication between companies and consumers. Performance bottlenecks have emerged over time, limiting the usefulness of the Internet infrastructure for business critical applications. These bottlenecks occur at distinct places along the network paths. Each distinct bottleneck demands a custom solution.

The "last mile" bottleneck has received the most attention over the past few years and can be defined as bandwidth which connects end users to the Internet. Solutions such as xDSL and Cable Internet access have emerged to dramatically improve last mile performance. The "first mile" bottleneck is the network segment where content is hosted on Web servers. First mile access has improved through the use of more powerful Web servers, higher speed communications channels between servers and storage, and load balancing techniques.

The "middle mile," however, is the last bottleneck to be addressed in the area of Internet routing and the most problematic under conventional approaches to resolving such bottlenecks. The "middle mile," or core of the Internet, is composed of large backbone networks and "peering points" where these networks are joined together. Peering points have traditionally been congested and under-built structurally, and there is generally no incentive for existing backbone network providers to cooperate to alleviate the congestion that exists. Given that over 90% of all Internet traffic passes through multiple networks, just increasing core bandwidth and introducing optical peering will not provide adequate solutions to these problems.

Peering is when two Internet Service Providers ("ISPs") connect in a settlement-free manner and exchange routes between their subsystems. For example, if ISP1 peers with ISP2 then ISP1 will advertise only routes reachable within ISP1 to ISP2 and vice versa. This differs from transit connections where fall Internet routing tables are exchanged. An additional difference is that transit connections are generally paid connections while peering points are generally settlement-free, that is each side pays for the circuit costs to the peering point but not beyond. There is an additional concept of paid-peering which is a hybrid of the two scenarios. A subset of the routing table is sent, yet a "not change" is incurred for traffic sent into the paid peering point.

Routes received through peering points are one Autonomous System ("AS") away from a BGP perspective. That makes them highly preferred by the protocol (and by the provider as well since those connections are cost free). However, when there are capacity problems at a peering point and performance through it suffers, BGP will still prefer the peering point and the end to end performance of all data traffic will suffer.

Since the peering points are settlement-free, there is no Service Level Agreement ("SLA") offered across such peering points. Since neither party pays the other for access or service, the remedial action in the case of poor peering point performance is generally a long wait for the downstream provider to improve capacity at that point. Structurally, the Internet and its peering points include a series of interconnected service providers. These network service providers maintain a service level within their autonomous system (AS) but provide no service level outside of that system. Thus, the Internet path from end to end is generally unmanaged with a "best effort" service level, making the Internet unreliable as a data transport mechanism.

Conventionally, several network providers attempt to improve the general unreliability of the Internet by using a "Private-NAP" service connecting major service providers. This solution, however, is incapable of maintaining service level commitments outside or downstream of those providers. In addition the common technological approach in use to select an optimal path is susceptible to multipath (e.g., ECMP) in downstream providers. The conventional technology thus cannot detect or avoid problems in real time, or near real time.

Additionally, the conventional network technology operates on only egress traffic. The ingress point of the network is difficult to control. These shortcomings prevent any kind of service level assurance across multiple providers, or end to end on the Internet.

In some common approaches, it is possible to determine in real time the service level being offered by a particular network service provider. This technology includes two types. First is near real time active calibration of the data path, using tools such as ICMP, traceroute, Sting, and vendors such as CQOS, Inc., and Keynote, Inc. Another traditional approach is real time passive analysis of the traffic being sent and received, utilizing such tools as TCPdump, and vendors such as Network Associates, Inc., Narus, Inc., Brix, Inc., and P-cube, Inc.

These conventional technological approaches, however, only determine whether a service level agreement (SLA) is being violated. An exemplary SLA is an agreement between a network service provider and a customer that specifies, usually in measurable terms, what service the network service provider will furnish. None of the approaches to Internet routing offer control or visibility into the network beyond the point of analysis. Although such service level analysis is a necessary part of service level assurance, alone it is insufficient to guarantee SLA performance. Thus, the common approaches fail to both detect and to optimally avoid Internet problems such as chronic web site outages, poor download speeds, jittery video, and fuzzy audio.

Therefore, there is a need for a system and a method to overcome the above described shortcomings of the conventional approach to network service level management. Accordingly, there is a need to provide Internet users with optimized paths such that guaranteed SLAs across multiple networks (on-net and off-net) are possible.

BRIEF SUMMARY OF THE INVENTION

The present invention relates to intelligent routing of data over networked communication systems, and more specifically to intelligent routing of Internet networks. The present invention maintains a traffic service level for data communicated by a computer network having a source. The computer network is electrically connected to at least one of many networks (e.g., the Internet), where each of the networks includes a number of paths used to, among other things, to transport the data to a destination. At least two of the networks are electrically coupled at an interconnection point and where the data communicated flows through the interconnection point. Such networks and interconnection points might respectively be Autonomous Systems and peering points, for example.

One embodiment of the present invention is a method of maintaining a traffic service level which intelligently routes data between the source and destination. The method comprises monitoring the traffic service level associated with one of a number paths between the source and the destination, determining whether the traffic service level associated with the path meets one or more performance metrics, indicating a service level violation when a flow of data communicated over the monitored path fails at least one of the performance metrics, and selecting an alternate path from the other paths between the source and the destination. The alternate path provides for a traffic service level that resolves the service level violation from the source to the destination.

Another embodiment of the present invention is a method for passively analyzing data flow to maintain a traffic service level for data communicated by a computer network. The computer network, having a source, is coupled to at least one of many networks, each of the many networks includes a number of paths for transporting the data to a destination. At least two of the networks are electrically coupled at an interconnection point where the data flows through the interconnection point. The method comprises capturing one or more data packets flowing from a source address to a destination address, parsing the one or more data packets to retrieve packet information, combining the packet information from the one or more data packets into one or more traffic flows, interpreting a service level for each of the one or more traffic flows from the packet information of the one or more captured data packets, correlating a traffic flow characteristic with the interpreted service level for each of the one or more traffic flows, grouping the traffic flow characteristic with an associated destination, and forming an aggregate service level from two or more traffic flow characteristics with the associated destinations. The aggregate service level for the associated destinations is used to determine an alternate path from the source addresses to the destination addresses.

Yet another embodiment is a system for maintaining a traffic service level of a traffic flow in which the traffic flows to and flows from a computer network having a source. The computer network is coupled to at least one of many networks, each of the many networks includes a number of paths for transporting the traffic to a destination from the source. At least two of the networks are electrically coupled at an interconnection point and the traffic flows through the interconnection point. The system comprises a passive flow analyzer configured to receive the traffic flow, a calibrator configured to actively probe one or more alternative paths to the destination to determine a subset of alternative paths, a traffic flow repository coupled between the passive flow analyzer and the calibrator to store information regarding the alternative paths and the traffic flow, a controller coupled between the passive flow analyzer and the calibrator, an optimizer coupled to the traffic flow repository to determine optimized ingress paths, a modulator coupled between the optimizer and the controller to generate a modified routing table, and a router to route the traffic flow according to the modified routing table. The modified routing table includes a changed source address where the changed source address is associated with an optimized ingress path from the destination and an alternate path to the destination.

Yet still another embodiment is a system for maintaining a traffic service level over at least two of the networks electrically coupled at an interconnection point, where traffic flows through the interconnection point. A first regional network includes a first region router coupled to a first region route server and a second regional network includes a second region router coupled to a second region route server. The system comprises a first region passive flow analyzer configured to receive the traffic flow from the first region, a second region passive flow analyzer configured to receive the traffic flow from the second region, a first region calibrator configured to actively probe one or more alternative paths to the destination to determine a first subset of alternative paths, a second region calibrator configured to actively probe one or more alternative paths to the destination to determine a second subset of alternative paths, a central traffic flow repository coupled between the first region passive flow analyzer, the second region passive flow analyzer, the first region calibrator and the second calibrator to store information regarding the first subset and the second subset of alternative paths and the first region and the second region traffic flow, and a central route server coupled between the central traffic flow repository and the first region route server and the second region route server to receive a first region routing table and a second region routing table, respectively. The central route server provides the first route server with a first modified routing table and provides the second route server with a second modified routing table.

DETAILED DESCRIPTION OF THE SPECIFIC EMBODIMENTS

Detailed descriptions of the embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1A:
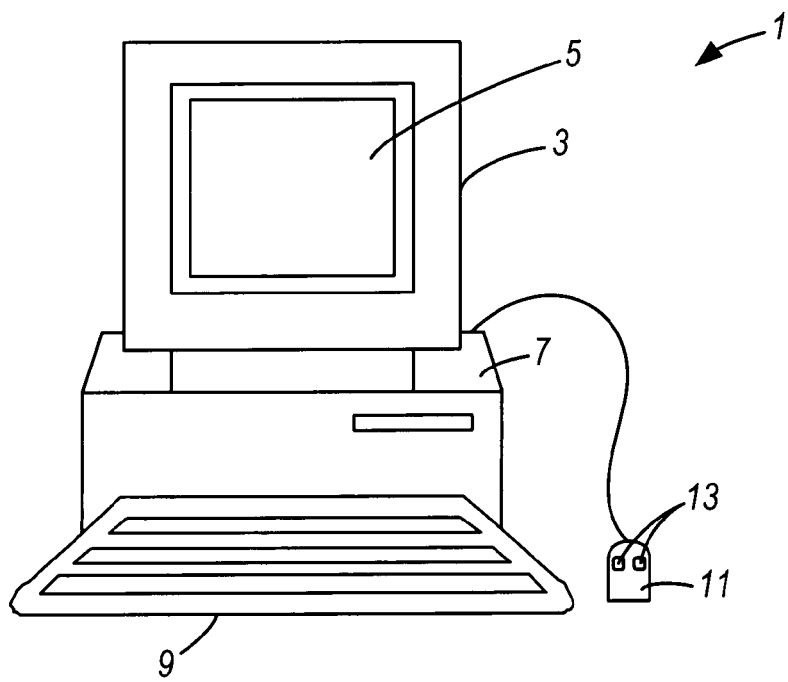
FIG. 1A is a computer system for presenting to a user a user interface suitable to practice an embodiment of the present invention.
Figure 1B:
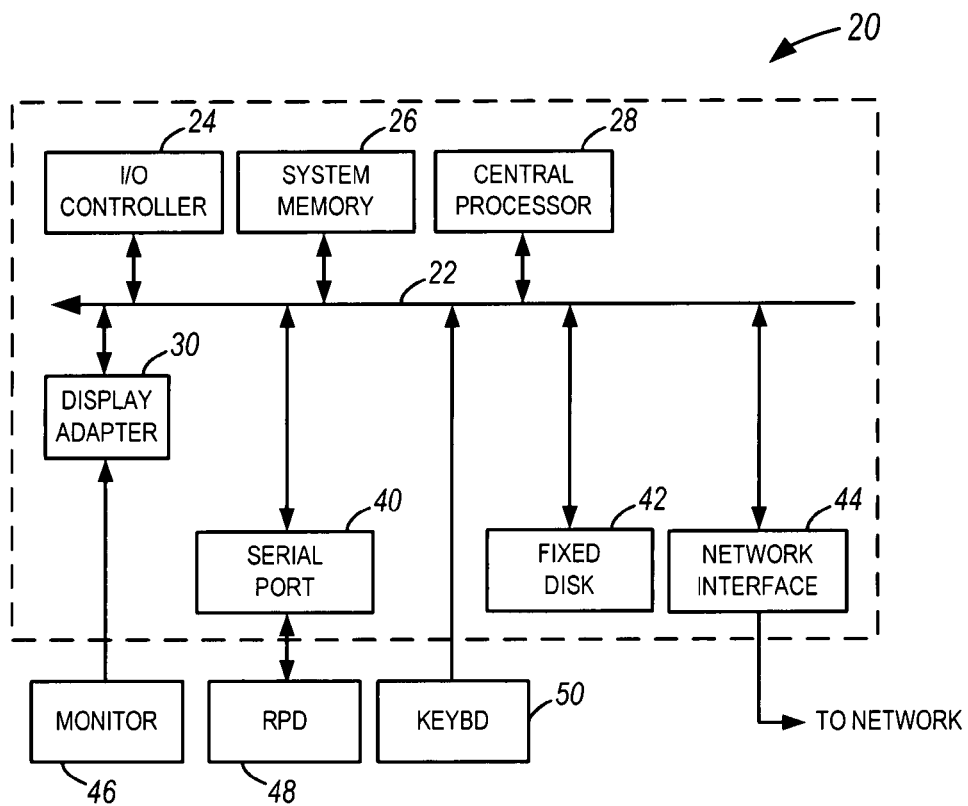
FIG. 1B shows basic subsystems in the computer system of FIG. 1A.
Figure 1C:
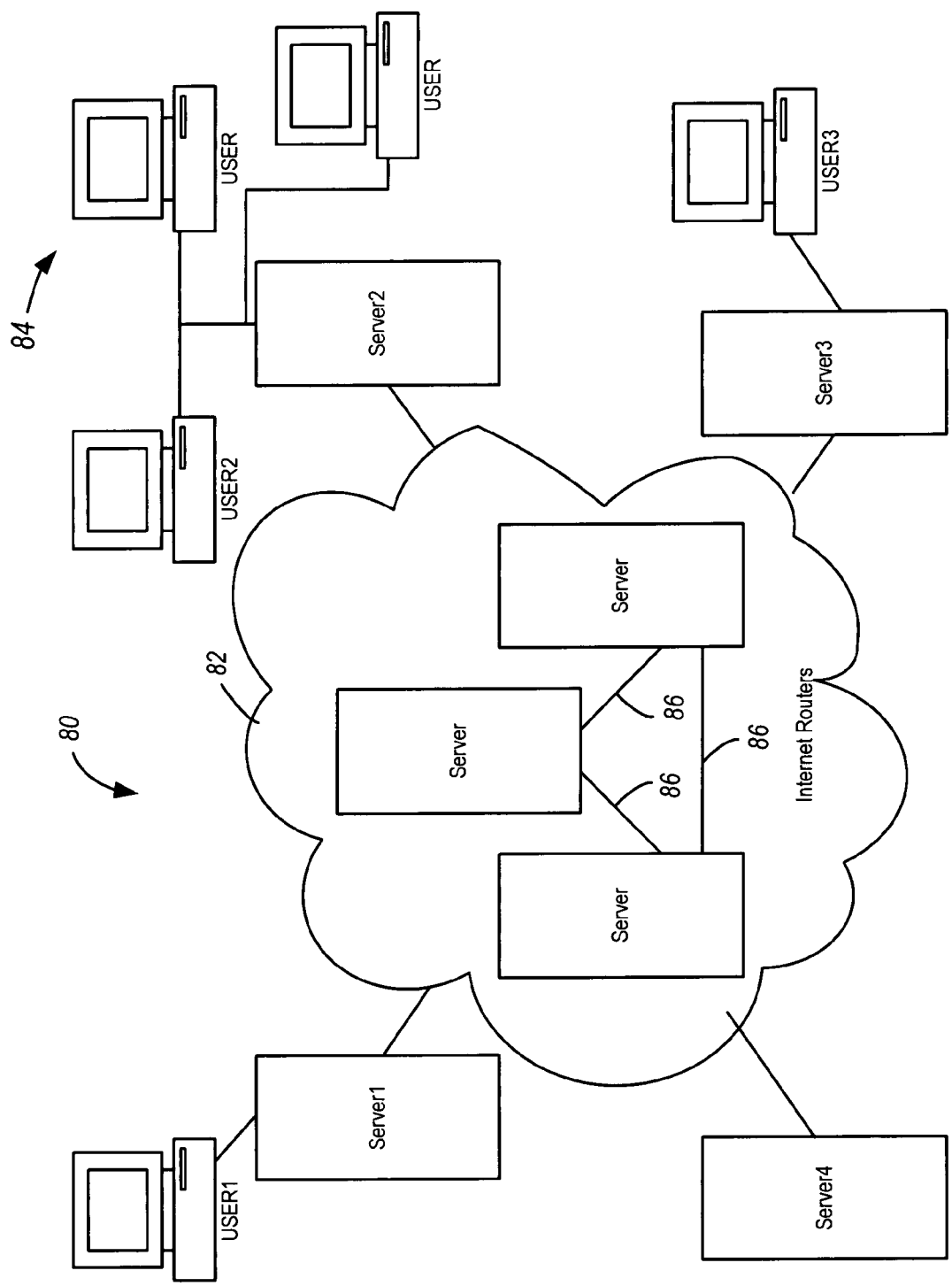
FIG. 1C is a generalized diagram of a typical computer network suitable for use with the present invention.

FIGS. 1A, 1B, and 1C illustrate basic hardware components suitable for practicing the present invention. FIG. 1A is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 1B illustrates subsystems that might typically be found in a computer such as computer 1. In FIG. 1B, subsystems within box 20 are directly interfaced to internal bus 22. Such subsystems typically are contained within the computer system such as within cabinet 7 of FIG. 1A. Subsystems include input/output (I/O) controller 24, System Memory (or random access memory "RAM") 26, central processing unit CPU 28, Display Adapter 30, Serial Port 40, Fixed Disk 42, Network Interface Adapter 44, which in turn is coupled electrically to a network. The use of bus 22 allows each of the subsystems to transfer data among subsystems and, most importantly, with the CPU, where the CPU might be a Sparc™, an Intel CPU, a PowerPC™, or the equivalent. External devices can communicate with the CPU or other subsystems via bus 22 by interfacing with a subsystem on the bus. Thus, Monitor 46 connects with Display Adapter 30, a relative pointing device (e.g. a mouse) connects through Serial Port 40. Some devices such as Keyboard 50 can communicate with the CPU by direct means without using the main data bus as, for example, via an interrupt controller and associated registers.

As with the external physical configuration shown in FIG. 1A, many subsystem configurations are possible. FIG. 1B is illustrative of but one suitable configuration. Subsystems, components or devices other than those shown in FIG. 1B can be added. A suitable computer system can be achieved without using all of the subsystems shown in FIG. 1B. For example, a standalone computer need not be coupled to a network so Network Interface 44 would not be required. Other subsystems such as a CDROM drive, graphics accelerator, etc. can be included in the configuration without affecting the performance of the system of the present invention.

FIG. 1C is a generalized diagram of a typical network that might be used to practice an embodiment of the present invention. In FIG. 1C, network system 80 includes several local networks coupled to the Internet. Although specific network protocols, physical layers, topologies, and other network properties are presented herein, the present invention is suitable for use with any path-diverse network (e.g., a multi-homed network interconnected with other networks).

In FIG. 1C, computer USER1 is connected to Server1, wherein the connection can be by a network, such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection of server routers 82. Note that the use of the Internet for distribution or communication of information is not strictly necessary to practice the present invention but is merely used to illustrate a specific embodiment, below. Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 line, a T3 line, Metro Area Ethernet, or the like, although it might be connected in a similar fashion as with USER1. Similarly, other computers 84 are shown utilizing a local network at a different location from USER1 Computer. The computers at 84 are coupled to the Internet via Server2. USER3 and Server3 represent yet a third installation.

Figure 8:
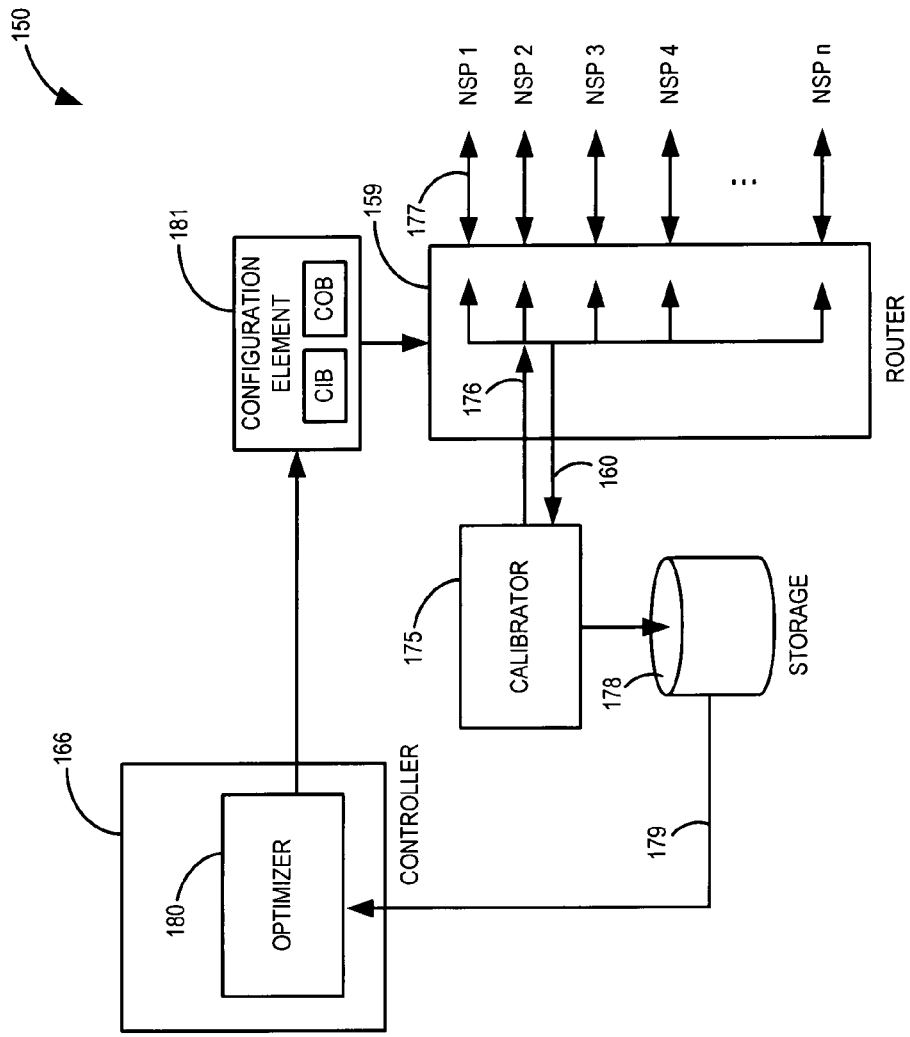
FIG. 8 is a simplified block diagram of a network path optimizer according to a specific embodiment of the present invention.

In a specific embodiment, one or more routers described herein are configured as Internet server routers 82 and peering points are exemplified as interconnections 86 between network service providers. Furthermore, some or all of the elements of the service level manager 100 of FIG. 2 and of network path optimizer 150 of FIG. 8 are configured to reside in either one or more computing devices shown in FIG. 1A, or alternatively, over one or more USER-type machines coupled over a network.

The present invention provides service level assurance through real time analysis of traffic, local path diversity and visibility into the downstream available paths. An exemplary system is managed by a control mechanism referred herein as a controller. A controller relies on feedback from the system components to make intelligent decisions about service level violations and to select an associated remedial action to overcome those violations. In one embodiment, real time passive service level analysis is provided by a passive flow analyzer at the customer aggregation point to ensure path diversity. The passive flow analyzer is aware of the service levels which must be maintained and will notify a controller in a network when the service level is violated.

In another embodiment, a network path optimizer includes a controller that uses visibility into the connected providers. Such a controller is configured to select among a series of alternative providers available through rich path diversity at the aggregation point. The controller can also alter the regional ingress point on the network by manipulating routing policy advertised to the connected providers or by manipulating the source address and using the diversity of the routing policy already in place. Such visibility into connected providers is enabled through a series of active mechanisms provided by a calibrator to calibrate each provider's traffic and all provider interconnection points (i.e., peering points). The active mechanisms characterize the path in both directions and can distinguish between problems inbound to the system or outbound from the system.

In yet another embodiment, additional feedback from the passive flow analyzer is used in combination with optimized paths as provided by the network diversifier. Optimized paths as determined by active mechanisms alone are inadequate to compensate for the prevalence of multipath (e.g., ECMP). Multipath is used with a connected provider's routing protocols, both IGP and EGP, and the calibration results from the active analysis otherwise may not be indicative of the experience the customer's traffic observes. Thus, a service level manager and network path optimizer according to the present invention are used to ensure that a new provider is maintaining the minimum service level to the final destination. If the service level is not being met by the new provider, another path is selected until the service level is met or the set of inbound and outbound paths is exhausted network wide.

Figure 2:
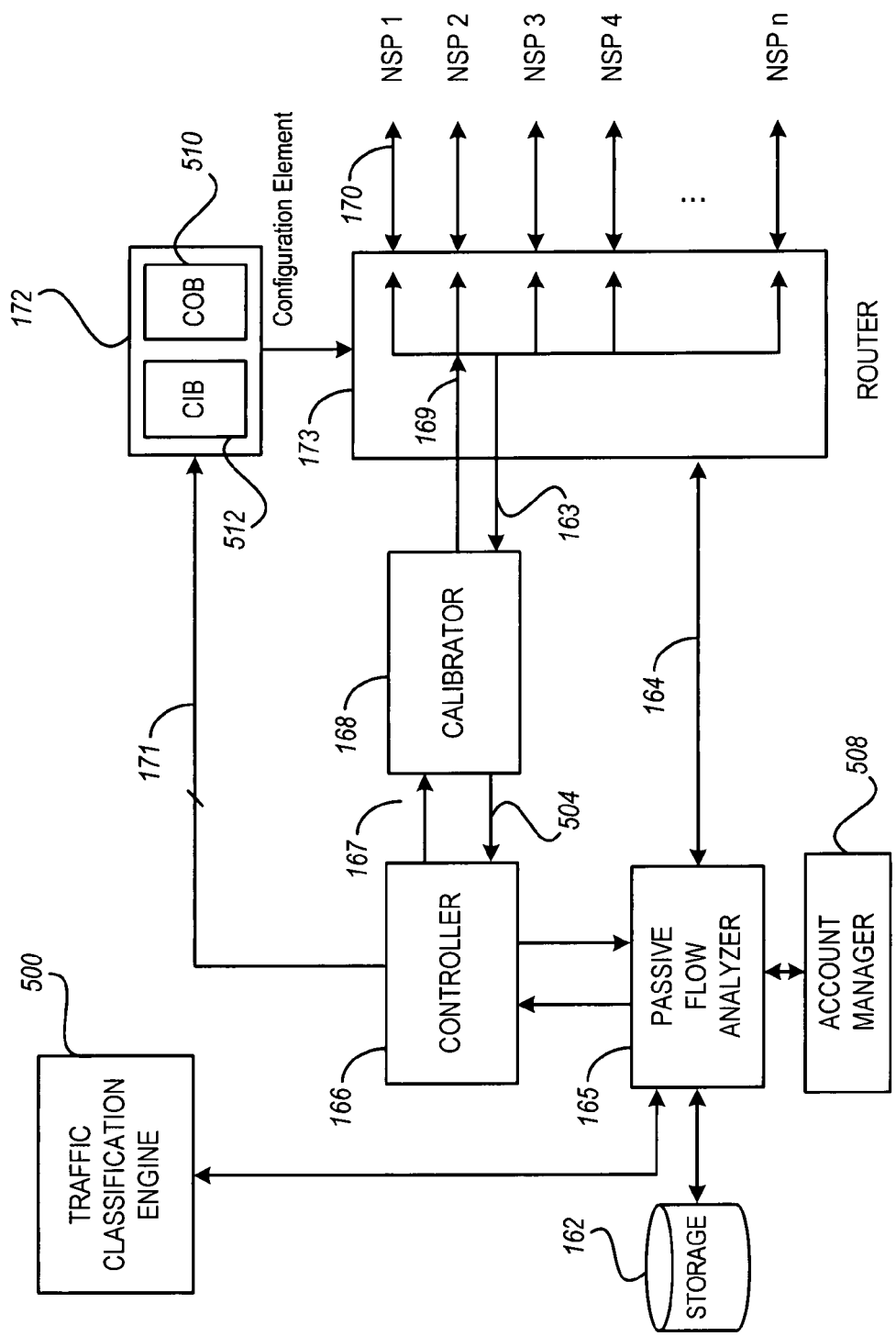
FIG. 2 is a simplified block diagram of a service level manager according to a specific embodiment of the present invention.

FIG. 2 illustrates exemplary system 100, or service level manager 100, according to a specific embodiment of the present invention. Exemplary service level manager 100 of FIG. 2 is shown to include, for example, passive flow analyzer 165 ("PFA"), controller 166, calibrator 168, configuration element 172, traffic flow repository 162 and router 173.

Passive flow analyzer 165 is configured to receive, without interfering with, network communication data 164, such as customer Internet traffic. Network communication data path 164 (i.e., Internet traffic) seen by passive flow analyzer 165 is the default routed path of the Internet traffic and is provided to passive flow analyzer 165 from router 173. Default routed path is, for example, the hop-by-hop path between routers that a packet would take, as determined by standard routing protocols. Passive flow analyzer 165 is electrically coupled to controller 166 to provide information which indicates whether the specific Internet traffic is within the range of acceptable performance metrics, such as determined by a service level agreement. Passive flow analyzer 165 operates to instantaneously monitor service levels of all traffic received by passive flow analyzer 165 by overcoming the complications of relying solely on active traffic analysis. When addressing SLA violations, for example, passive flow analyzer 165 operates to overcome the complications of performing active traffic analysis in the presence of multipath (e.g., ECMP).

The actual traffic received into passive flow analyzer 165 is used as a network probe. Passive flow analyzer 165 examines the traffic stream in both directions (i.e., ingress and egress) and classifies each of the traffic streams into flows. Such flows are monitored within passive flow analyzer 165 according to the underlying protocol state (e.g., such as TCP) over time. For example, passive flow analyzer 165 classifies the traffic flow according to round trip latency, percentage of packets lost, and jitter (for specific protocols) for each of the traffic routes, or flows. Such traffic route information is used to characterize the "end-to-end" performance of the traffic flow rates of packets and is aggregated into a series of network prefixes.

In an embodiment of service level manager 100, passive flow analyzer 165 is electrically coupled to store, fetch and update traffic route information stored in traffic flow repository 162. Exemplary traffic route repository 162 is a database, such as a storage device, configured to store a large number of records for storing traffic route information. The data maintained in traffic route repository 162 is very useful to the end user employing a system, such as the one shown in FIG. 2, as well as the operators of, for example, an Internet service provider. The data within traffic flow repository 162 includes long term statistics about the traffic. These statistics will be used for reporting and analysis purposes and provider general feedback to a user. Such feedback will consist, for example, of types of traffic being sent, source addresses, destination addresses, applications, traffic sent by ToS or DSCP ("DiffServ Code Point") setting (which might be integrated into a differentiated billing system), and volume of traffic by each of the above. These statistics will be fed into traffic flow repository 162 where, for example, a reporting engine (not shown) or some other analysis process can have access to them. The information stored in traffic route repository is data representing such traffic route characteristics arranged in any suitable data structure as would be appreciated by one skilled in the art of database management.

Passive flow analyzer 165 is configured further to receive service level agreement ("SLA") performance metrics in which to compare against the traffic performance information determined by passive flow analyzer 165. If a particular SLA is violated (i.e., one or more performance metrics are outside one or more agreed upon ranges or values), passive flow analyzer 165 communicates to the network that a routing change is necessary for the prefix which is underperforming. When passive flow analyzer 165 determines that a customer's traffic reaches a minimum service trigger level (i.e., one or more pre-determined performances metrics violations which, when encountered, requires corrective action), passive flow analyzer 165 communicates such a condition to controller 166. Controller 166 then functions to take remedial action for this under-performing traffic route. The functionality and structure of exemplary controller 166 is described below in connection with the description of FIG. 20.

In another embodiment of the present invention, service level manager 100 includes account manager 508 coupled to passive flow analyzer 165 to manage each customer's costs according to different levels of service. Among other things, account manager 508 performs differentiated billing analysis of the customer traffic. The traffic is consolidated per classification (described below) and is presented to, for example, an external billing system as a distinct billable event with potentially a different billable rate. Since passive flow analyzer 165 observes and parses the traffic it is able to determine any billable event in that traffic from premium classification to time of day to traffic volume.

In yet another embodiment of the present invention, service level manager 100 includes a traffic classification engine 500. Traffic classification engine 500 is coupled to passive flow analyzer 165 to provide additional information on the ingress traffic so that service level manager 100 can meet the various needs of different classes of traffic. Exemplary traffic classification engine 500 is discussed below in connection with FIG. 21.

Controller 166 is coupled to calibrator 168 to provide a destination address 167 which is not meeting the minimum service level. Once received, calibrator 168 then initiates a calibration which determines all of the available network paths to the destination address. In one embodiment, calibration probes 169 are communicated to all available Internet paths. The returning calibration probes 163 report probe information 504 back to controller 166 which contains available paths. Controller 166 then determines how best to reach the destination address via a particular provider, such as Network Service Provider 2 ("NSP 2"). Exemplary calibrator 168 is discussed in further detail below.

Configuration element 172 is coupled between controller 166 and router 173. Controller 166 provides the best route to reach destination 171 requiring corrective action. Configuration element 172 then operates to change the default routing behavior for that destination at router 173. Once router 173 receives this information, the controller communicates back to passive flow analyzer 165 to clear its state and to resume monitoring the destination to ensure that the new route, or path, meets the minimum service level (e.g., no violations of SLA, or no unacceptable deviations from agreed upon performance metrics). In one aspect, configuration element 172 resides in a route server. In another aspect, configuration element 172 resides in a router and is configured to modify a route map. In yet another aspect, configuration element 172 is adapted to provide configuration information about inbound ("CIB") and outbound ("COB") traffic. As shown in FIG. 2, configuration element 172 includes CIB 512 to receive and provide to router 173 a modified address for ingress traffic and also COB 510 to receive and provide to router 173 a modified address for egress traffic.

Calibrator 168 provides active mechanisms to determine the nature of downstream or upstream paths. This information is not carried in any conventional protocol used on the Internet, and must be collected external to the normal processes of the Internet. Each Point-of-Presence ("POP") including an embodiment of this invention has several computer systems dedicated specifically to the collection of this information, as depicted in FIG. 4B. For example, each of the elements of the present invention might be implemented in a single computing device, such as a server, or might be implemented over one or more computing devices.

Each of the computers in such an AS or in a POP may be, for example, one or more commercially available PCs running an operating systems with a well defined TCP/IP implementation, such as shown in FIGS. 1A and 1B. The operating system of choice is typically any BSD variant, where FreeBSD is the most available since the TCP/IP implementation is well defined and open. A person having ordinary skill in the art, however, will appreciate that other operating systems (OS) may be used to practice the present invention and that there is no restriction to use only freeBSD or BSD in general.

Active calibration mechanisms performed by calibrator 168 might be used to provide long term statistics for use with network prediction algorithms, such as neural networks. Such algorithms will attempt to predict the future performance of that path. If the algorithms determine that a particular path in use will have poor performance over an upcoming period, the network control element (i.e., controller) can take proactive action to change the path before the upcoming service degradation. Network changes made on the basis of predictive algorithms are at, for example, "preference 175" which is higher than the default routes heard, yet lower than any routes overridden due to passive analysis and the subsequent reaction to service level violations ("preference 200" or above). Such a preference might be a BGP preference, wherein the preference indicates a preferred route among other alternative routes. Predictive routing changes are communicated to the network using either the route server or another configuration element (i.e., route modulator) such as a route map.

In another embodiment, calibrator 178 performs its process and resides on router 173 itself, or can be integrated into controller 166. There are several proprietary implementations of commercially available routers suitable to practice the present invention, For example, Cisco systems uses Service Assurance Agent ("SAA") which is derived from the remote monitoring ("RMON") probes to send out active probes. SAA allows routers to measure and report network-originated application round trip times. Although not every probe mentioned below is available in SAA for network calibration, one skilled in the art would appreciate how each of the following might be implemented to practice one or more embodiments of the present invention.

An ICMP (Internet Control Message Protocol) echo request, or ping, is a simple and the most common probe used on the Internet. This probe uses a special type of packet to record the round trip time ("RTT") to a specific destination. The calibrator maintains a count of the number of packets sent and correlates this against the number of packets received to calculate the percentage of packet loss observed. The most significant disadvantage of the ICMP echo request probe is that routers tend to process ICMP traffic at a lower priority than other traffic. Therefore, occasionally, the negative effects of network congestion can be exaggerated by these probes. Another problem is that ICMP traffic is often the vehicle used for a wide variety of denial of service attacks on the Internet. Therefore, it is common practice for network service providers to rate limit or drop ICMP traffic above a certain volume threshold. This can tend to skew the results from these probes and is manifest in higher percentage packet loss than ordinary traffic would observe. Additionally, the widespread use of firewalls in the Internet can prevent some addresses from getting probed at all. It is common practice for firewall policies to deny all ICMP packets. This forces the probes to move one or two hops upstream in the network to find a probable address. It is possible the such probes would miss performance problems in the paths downstream from the probed address.

A lightweight TCP-based probe is one of a several other probes used to overcome all of the deficiencies of ICMP. The lightweight TCP-based probe is used to probe TCP stacks. The probe traffic can be made to look like normal web traffic and therefore bypass restrictive firewall filters. TCP traffic is handled at normal priority in most Internet routers getting around yet another problem with ICMP. Finally, TCP traffic is not going to be rate limited by providers to prevent denial of service attacks.

Figure 3:
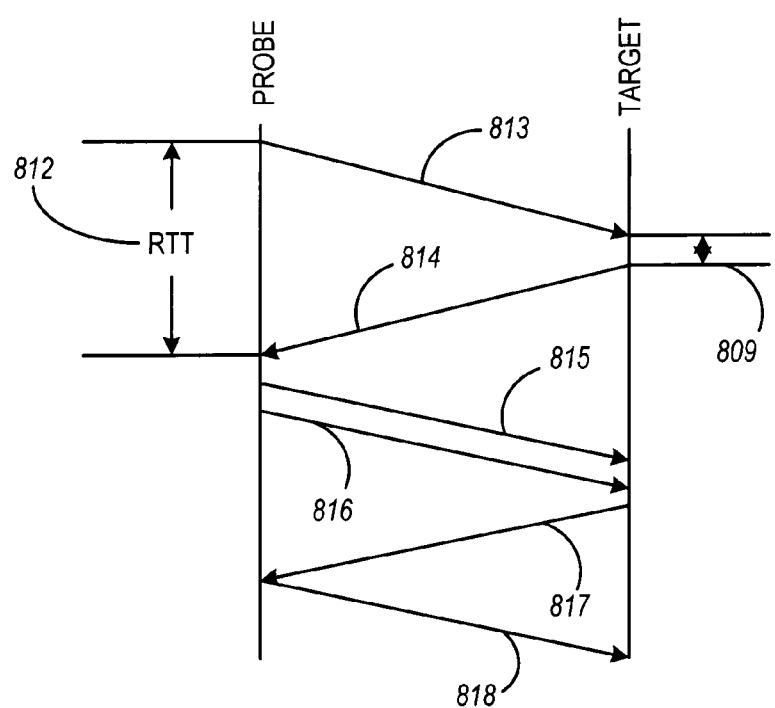
FIG. 3 is a simplified timing diagram of a sample light-weight TCP probe.

A sample lightweight TCP probe is shown in FIG. 3. The probe sends a normal TCP SYN to port 80 or another open port, such as one used for monitoring HTTP traffic. If that port is open on the receiving end, the probed machine will respond with a SYN ACK. The round trip time for this handshake is an estimate of network latency. The probe can then complete the handshake and then close down the connection. If the receiving end is not listening to that port an RST should be sent and again the round trip time is the estimate for network latency. These probes can be repeated and any time a handshake is not completed it is an instance of network loss and that is recorded as well.

As shown in FIG. 3, a lightweight TCP-based probe performs certain measurements. The probe is nominally sent to a common port, such as port 80, that is open on most firewalls and is normally open on any web server. The probe measures the time it takes to perform a TCP handshake and that measurement of time is indicative of the time instantaneous network latency. The probe initiates the handshake with SYN packet 813 which, after a very short delay 809, the target responds to with SYN ACK packet 814. The time difference between these two packets 812 is the measured round trip time (RTT). The probe then responds with ACK packet 815 followed by FIN packet 816 to terminate the TCP session. The server responds with FIN ACK 817 which is acknowledged by probe 818. If the target is not listening on the port in question, typical destinations will respond with a TCP reset instead of SYN ACK 814. Such a TCP reset is suitable as a measurement for RTT and can be used instead.

A Sting probe is a more sophisticated type of TCP probe which might be employed in the practice of the present invention. A Sting probe is a program that measures forward and return path packet loss in addition to network latency. This allows the control process of controller 166 to identify the egress path or ingress path that is responsible for the nature of the problem being observed.

Intelligent routing decisions might also be based on other significant probes, such as traceroute. Traceroute is a common active probe used for path analysis that uses a series of UDP packets with a pre-determined constrained time to live (TTL). When the TTL expires on the network, the forwarding element will notify the sender of the expired TTL with an ICMP packet. In this way, by incrementing the TTL for each subsequent packet the probe can get a response from every hop in the path. This response will also record the round trip time to the hop. Targeting a series of these traceroutes to a specific destination across every egress service provider yields the hop-by-hop behavior to the destination from each vantage point. This tool can also give you a rough estimate of where the majority of the network latency is occurring.

Additionally, with routing table information, it is possible to identify the AS that each hop corresponds to. When the AS number changes on a path, that hop represents a peering point or transit connection. These are interesting points on the Internet to map and maintain current state on. With enough probe results an AS using an embodiment of the present invention can build and maintain a map of all inter-provider peering points and the current state of those peering points.

Additional probes such as "pathchar," which is well known in the art, can be used to estimate the amount of capacity available at these peering points. An embodiment of the present invention will use a series of massively parallel trace probes to send a high volume of probes and map out the peering points when there is sufficient network resources to run these probes. The destinations of the probes can be arbitrary. Example targets would be the "0.1" address of every /24 which is in the current routing table. This provides path information for more than 4.7 million routes.

The target of active probes will typically be addresses in a prefix that is having trouble meeting the minimum service levels. Sometimes there might be probes sent on a regular basis to a fixed set of addresses to obtain periodic route information. These active probes are used to gather the necessary information for optimizing and predicting routines in the control process of controller 166 of FIG. 2. The method for selecting this set of addresses will be discussed below. Other targets are arbitrary, as in the mapping probes (i.e., high volume mapping probes) mentioned above.

The rate of active probing is variable and depends on the nature of the process requesting the probes. The high volume mapping probes need not be run frequently and are designed to keep up with, and to determine new peering points on the Internet. The results, such as received by calibrator 175 of FIG. 2, are gathered for optimization and prediction and are sent on a fairly infrequent, but predetermined basis. Probes for such purposes generally sample paths at twice the rate the system expects to make optimization changes. Such optimization might be performed by optimizer 180 of FIG. 8, for example. If changes to routing behavior (e.g., changing routing tables) are made hourly, the system will probe these addresses at least every 30 minutes.

Other probes are designed to probe current addresses actively to catch low volume times when the customer may not be sending any traffic. For example, passive probes might be unable to catch and record events used to optimize routing. These probes follow the default routing behavior, such as indicated by the routing tables, to the current set of destinations that are active. These probes are designed to monitor the service levels being maintained during a predetermined interval and therefore are sent fairly frequently, such as on the order of every 5 minutes.

A final set of probes might be sent during an episode (i.e., episode probes) when a service level is not being maintained. These are a series of high resolution probes originating out of all service providers to determine the ordered list of provider performance to select a best egress point on the network to that destination. The results from these probes are fed back into the control process of controller 166. These probes are executed and terminated by controller 166 as needed to resolve an episode.

The above probes received back by calibrator 168 of FIG. 2 are sent out by their source addresses. Probes are all sourced and received on an exemplary stats computer system resident, for example, in the local POP, or as a stats process on the router. An exemplary stats computer system 279 is shown in FIG. 4A and includes such a calibrator 168 of FIG. 2 within the stats computer system.

Figure 4A:
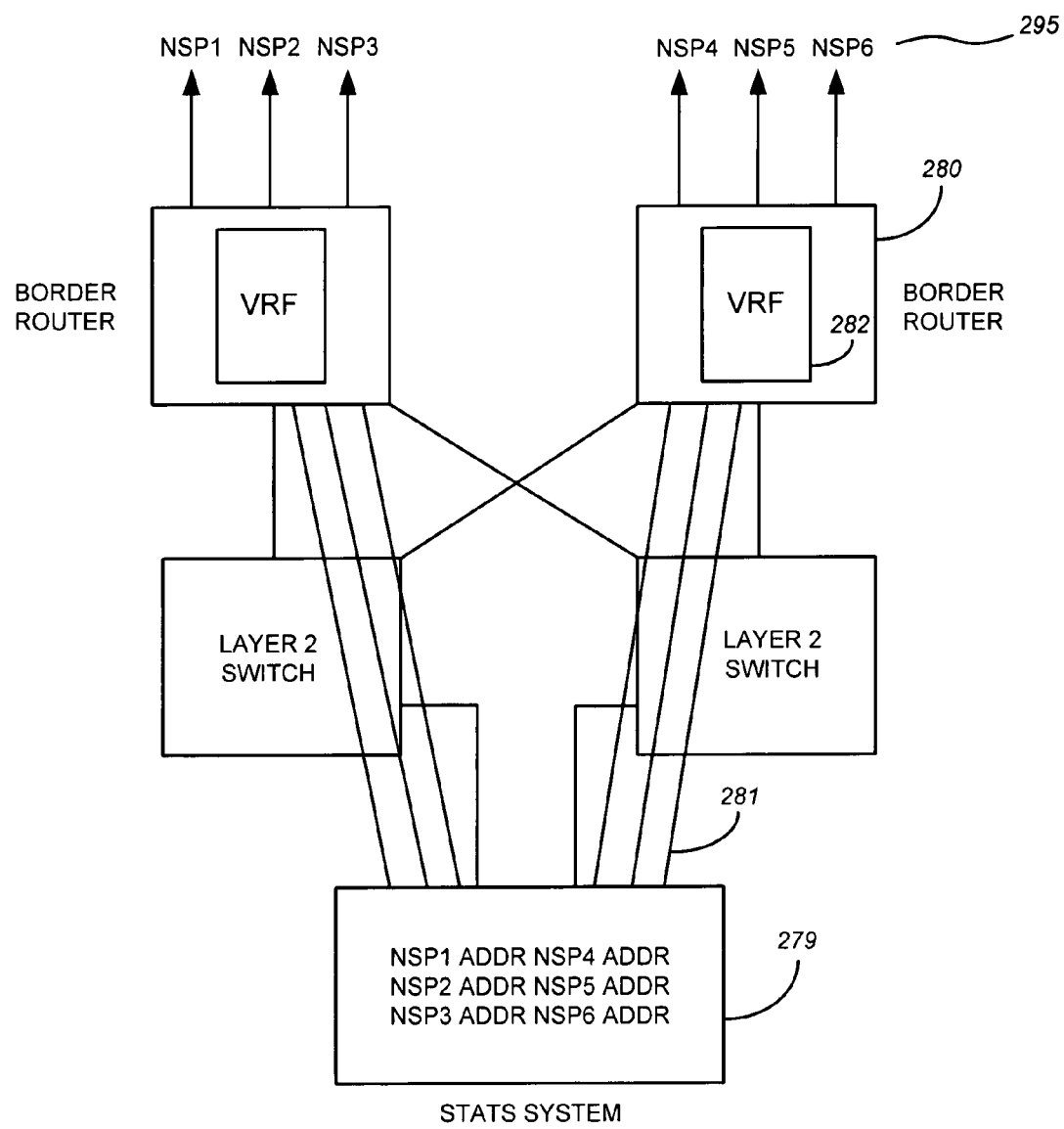
FIG. 4A is a simplified block diagram a POP according to one embodiment.
Figure 4B:
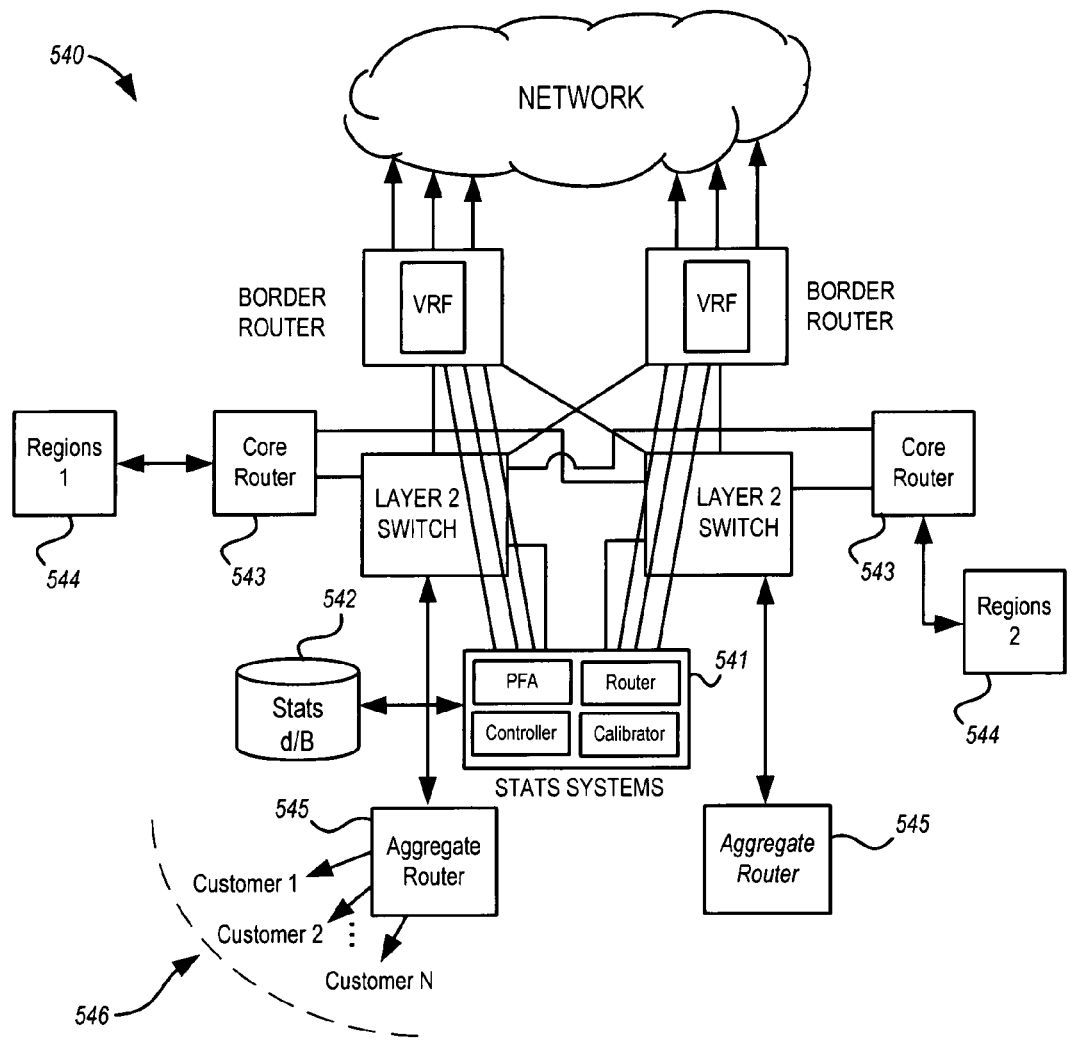
FIG. 4B is a more detailed block diagram a POP according to a specific embodiment.

FIG. 4A shows the stats computer system 279 integrated into a POP architecture. With stats computer system 279, the interfaces of a system embodying the present invention have many secondary source addresses associated with the systems. Each transit provider, for example, is routing a small network (a /29 or /30) of their address space to the POP. At least one of the addresses for each provider is a secondary address on the stats computer system. Additionally, there are a number of locally advertised addresses with a unique address for each downstream provider.

FIG. 4A shows a stats computer system 279 configured within a POP. The stats computer system 279 is, for example, a PC running FreeBSD. The stats computer systems are connected though a layer two switch fabric to a series of Border Routers 280 that are running VRRP (Virtual Router Redundancy Protocol) or HSRP (Cisco's® Hot Standby Routing Protocol). The default route of stats computer system 279 is to the shared HSRP IP Address configured on border router 280. Stats computer system 279 has a number of secondary IP addresses which correspond to a number of possible egress paths in the POP. Each address maintains a relationship with a given egress provider in the database and has a configuration on border router 280. The secondary IP space when used as a source address gets sent to border router 280 as an 802.1q VLAN tag, for example. When that tagged frame reaches border router 280 it is passed to Virtual Routing Forwarding table (VRF) 282 that has a routing entry specifying the next hop of any of network service providers 295 that the source address is associated with. This allows the stats computer system 279 to overcome default routing behavior and actively probe all possible providers in the local POP.

To route stats traffic, there is an association of a source address with a downstream provider either configured locally or read in from a configuration table at startup. Each provider has one address from the providers address space and one from the locally advertised address space. When a probe is sent, there is a policy statement on stats computer system 279 that associates the source address with Virtual LAN tag 281, such as 802.1q VLAN, that is built between border router 280 and stats computer system 279.

When tagged frame 281 arrives at border router 280, border router 280 associates that tagged frame 281 with VRF 282 that forces that probe out the next hop associated with that service provider 295 regardless of default routing behavior for that destination. This forces the probe out the necessary interface and overrides the default routing behavior. If the source address was from the provider space, the return path will be via that provider as well. If the source address was from the locally advertised space, the return path will be according to that advertisement regardless of the downstream provider that was used for egress. Depending on the source the probe will return two different results for that destination.

If there are N downstream providers, it is possible to source out N(squared) possible paths by manipulating provider source address and egress VLAN tags 281. This allows the probes to send traffic out a first service provider ("NSP1") and receive that traffic from a second service provider ("NSP2"). This information is necessary for a controller to select both an egress provider and an ingress provider for the network.

It might also be advantageous to use a default source address that is advertised in the same way a specific (i.e., customer) address space is advertised. In this way the return path of the probe is the same as the return path of the customer's traffic. This is true only if the source address has not been modified for ingress point control in which case the provider space probes measure the return path that the traffic takes.

Figure 13:
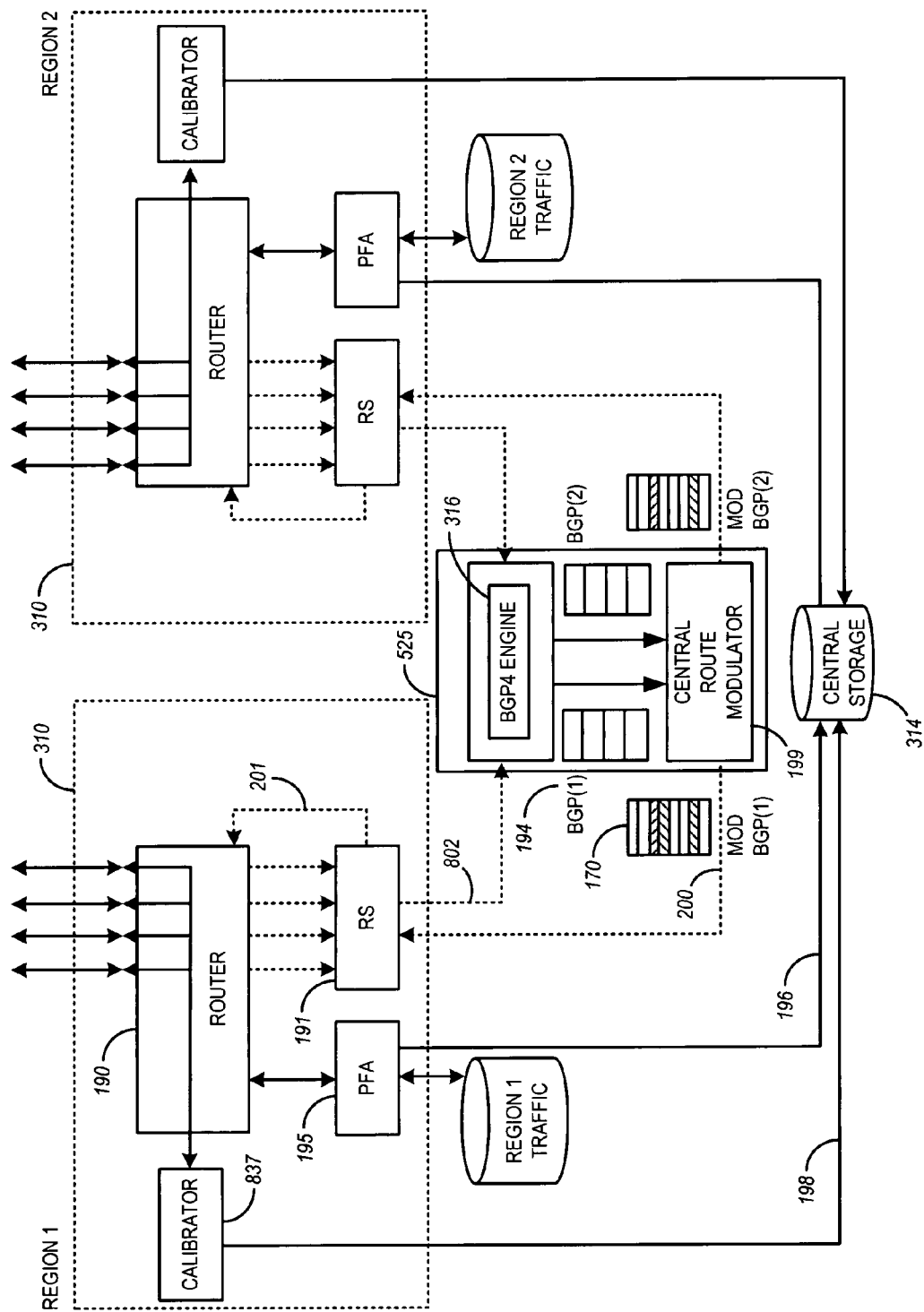
FIG. 13 is a block diagram of a system used to make wide area networking changes according to still yet another embodiment of the present invention.

FIG. 4B shows exemplary POP 540 according to the present invention, which includes service level manager 100 of FIG. 2 and network path optimizer 150 of FIG. 8. Exemplary stats system 541 includes a passive flow analyzer, a router, a controller and a calibrator, as well as stats database 542, all of which are described herein. Also included is one or more core routers 543, one or more regions 544 and one or more aggregate routers 545. Core routers 543 are, for example, a central router controlling most or all of the routers of an Autonomous Systems' network. Regions 544 represent, for example, additional POPs and corresponding networks in different geographic regions. Such regions 544 are depicted in FIG. 13 as regions 310. Aggregate routers provide control and access for the network's customer, according to the present invention. A person having ordinary skill in the art should appreciate how to implement stats system 541 with POPs known in the art.

Figure 5:
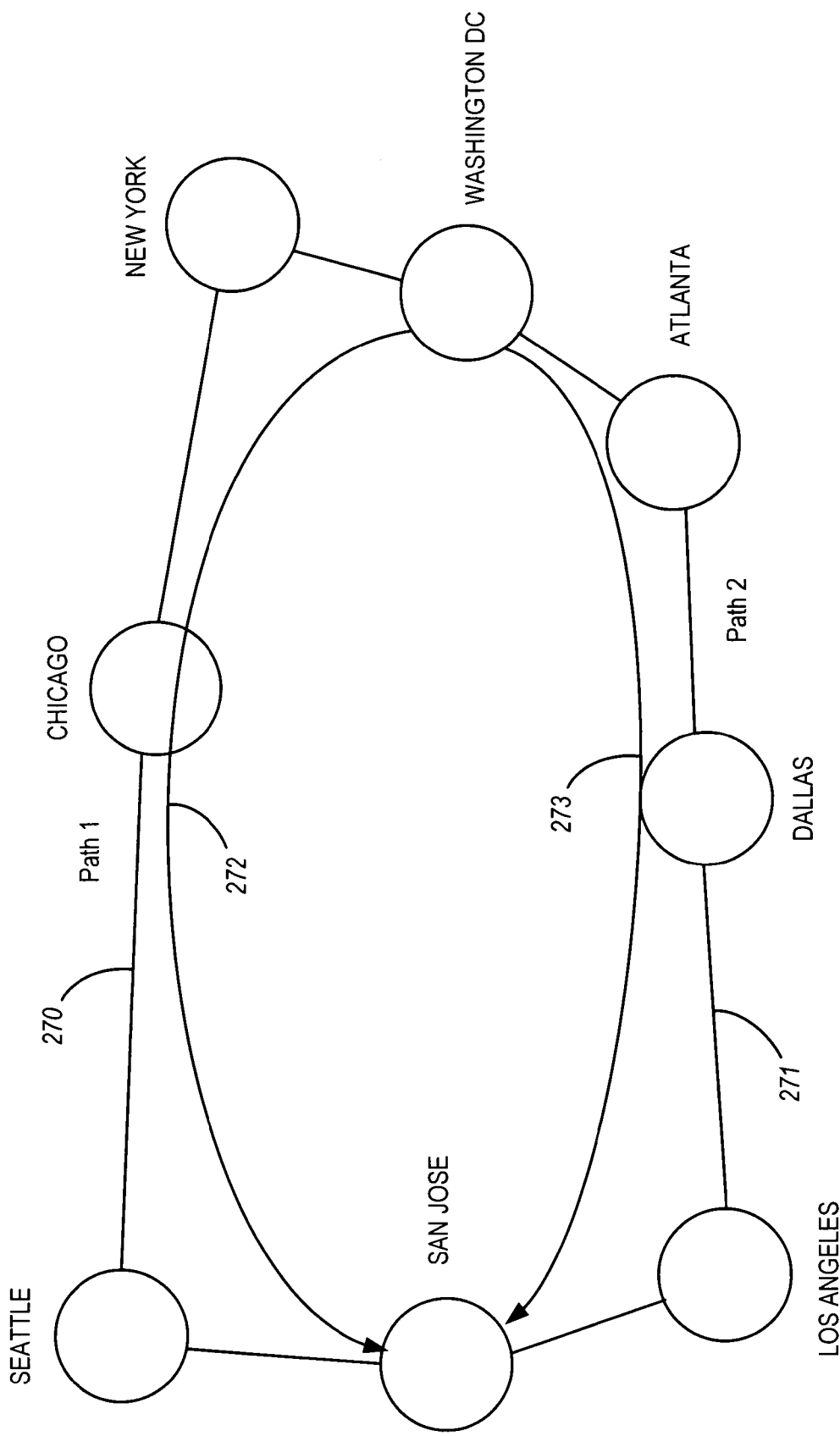
FIG. 5 depicts a general network using multipath wherein passive analysis is to be applied.

FIG. 5 shows the effects of multipath (e.g., ECMP) on active calibration in which the service manager using a passive flow analyzer detects and compensates for such effects. Two possible paths exist between Washington DC and San Jose for a given network service provider. The first path 270 traverses New York, Chicago and Seattle. The second path 271 traverses Atlanta, Dallas and Los Angeles. Suppose that the costs to use either of the paths is equal in the routing protocol. Most router vendors when presented with two equal costs paths will load share traffic between them making sure that paths in the same flow will follow the same route. The path selection algorithm is vendor specific but generally relies on the source IP address and destination IP address. Unless the source IP address and destination IP address are the same, the traffic may take a different equal cost path. The implications for path calibration are that the active probes sent across the network between Washington D.C. and San Jose may take the northern path through Chicago 272 while the customer's traffic may take the southern path through Dallas 273, because while the destination IP address is the same, the source IP address is different. Thus, the path measured may not be the path that is actually taken by the customer's traffic.

Figure 6:
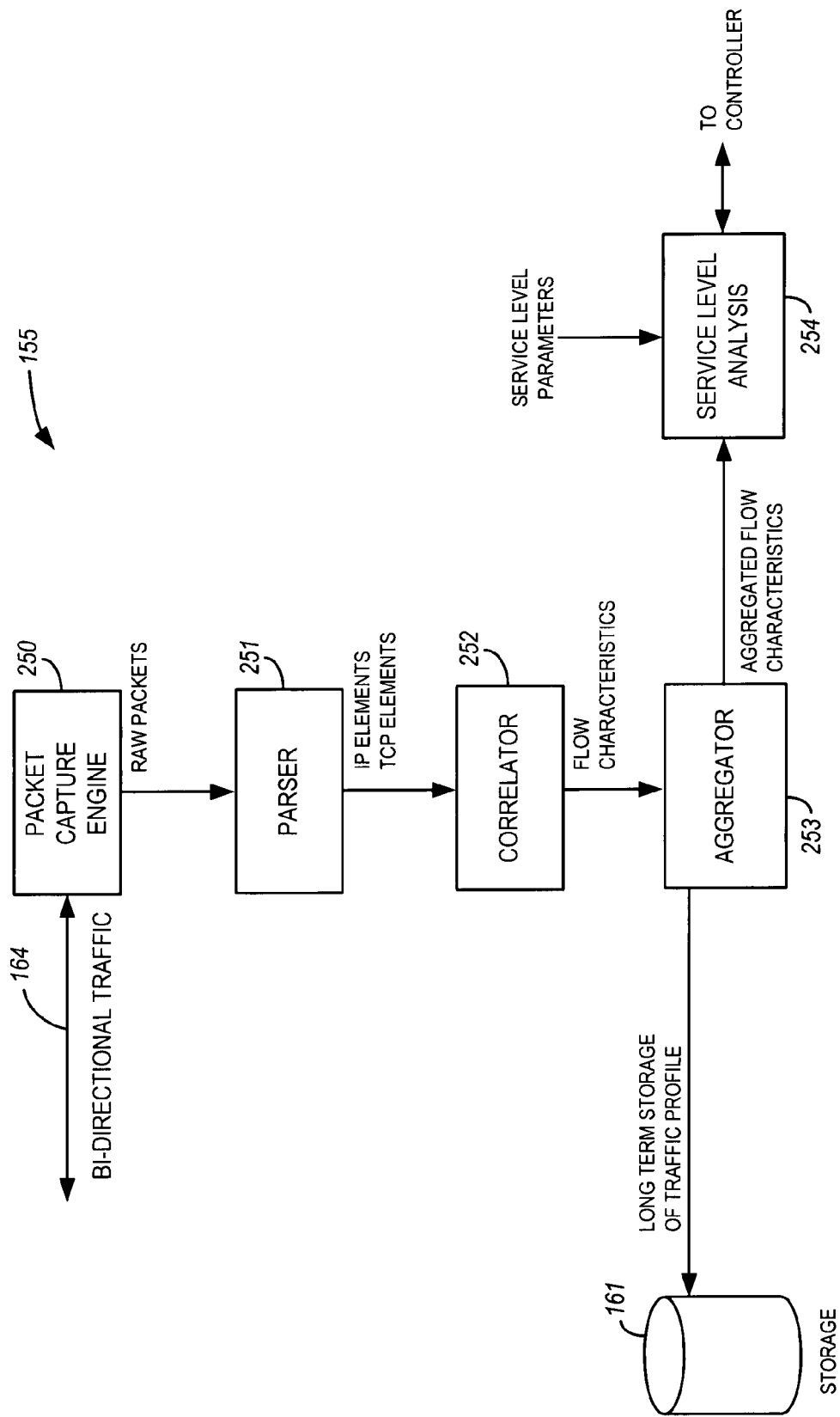
FIG. 6 is a block diagram of a passive flow analyzer according to a specific embodiment.

FIG. 6 illustrates a more detailed structure of an exemplary passive flow analyzer 165 of FIG. 2. In FIG. 6, passive flow analyzer 155 includes packet capture engine 250, packet parser 251, correlation engine 252, aggregator 253 and service level analyzer 154. Packet capture engine 250 is a passive receiver configured to receive customer traffic coming into and out of the network. Capture of traffic 164 is used to facilitate traffic analysis and to determine a particular traffic route that meets minimum service levels. Packet capture engine 250 is designed to remove one, several or all packets from a traffic stream, including packets leaving the network and entering the network. Packet capture engine 250 operates to remove certain packets up from the network drivers in the kernel into user space by writing custom network drivers to capture part of a packet. Using DMA the partial packet can be copied directly into user space without using the computer CPU. Such packets are typically removed according to one or more filters before they are captured. Such filters and the use thereof are well known in the art and can be designed to remove all TCP traffic, a specific address range or ranges, or any combination of source or destination address, protocol, packet size, or data match, etc. Several common libraries exist to perform this function, the most common being "libpcap." Libpcap is a system-independent interface for packet capture written at the Lawrence Berkeley National Laboratory. Packet capture engine 250 is also designed to duplicate each of the packets, and its information, which flow in and out of packet capture engine 250, wherein the original packets pass through passive flow analyzer 155 without modification.

Parser 251 is coupled to receive captured raw packets and operates to deconstruct the packets and retrieve specific information about the packet from each in the traffic flow. Exemplary parser 251 extracts information from the IP and TCP headers. Such extracted information from the IP headers include source and destination IP addresses, DSCP information encoded in the ToS (i.e., "type of service") bits, and the like. DSCP carries information about IP packet QoS requirements. Each DSCP defines the Per Hop Behavior of a traffic class. DiffServ has 64 code points so that it can define 64 different types of traffic classifications. TCP header information includes source and destination port numbers, sequence number, ACK number, the TCP flags (SYN, ACK, FIN etc.), the window size, and the like. Parser 251 is electrically coupled to correlator 252 to provide for reconstruction of flows by matching source and destination IP addresses and port numbers, similar to the process of stateful monitoring firewalls and their connections as well as the address that initiated them.

It is worth noting that TCP elements parsed from the TCP headers are most useful in determining whether a minimum service level is being maintained. An increasing amount of traffic, however, does not rely on TCP and instead uses UDP. UDP does not contain the necessary information to enforce service levels according to conventional approaches. To enforce service levels to these destinations, the present invention might employ a statistically relevant amount of collateral TCP traffic going to the same prefix or a series of active probes to the same destinations, or have the analyzer parse deeper into the packet and understand the traffic at the application layer (e.g., layer 7). There are some protocols running on UDP that have very specific requirements that are different from most other data traffic on the network. These protocols are roughly classified as "real-time" protocols and include things like streaming media and Voice over IP ("H.323"). Packet loss and latency below a certain level are secondary concerns for real time protocols. More important is reducing the variance in inter-packet arrival times, which is commonly referred to as jitter. Many real time protocols such as H.323 report the observed jitter in back channel communication known as the RTCP ("Real-Time Transport Control Protocol"), which is used to distribute time-dependent media data via IP multicast with feedback. If passive flow analyzer 165 of FIG. 2 is "application-aware," it can capture and observe the contents of the RTCP and be aware when the underlying network path is not meeting minimum jitter requirements. This could trigger an SLA violation in the same manner that 30% packet loss would.

Figure 7:
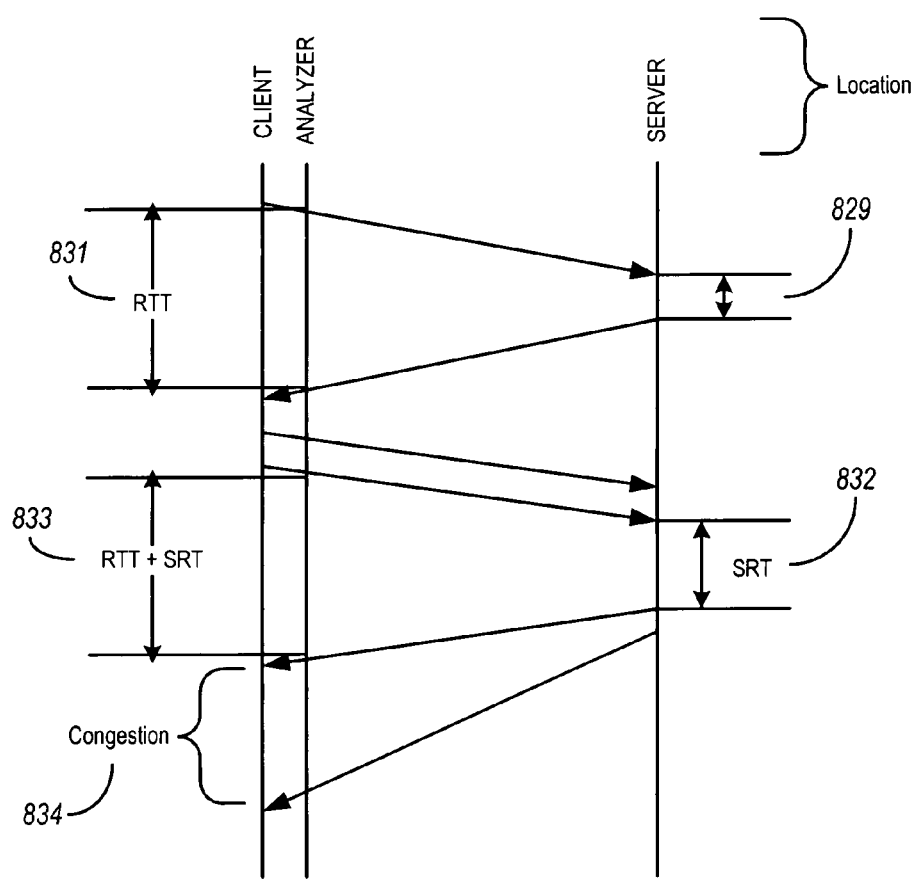
FIG. 7 is a simplified timing diagram of determining network congestion.

Correlator 252 operates to interpret the elements (e.g., TCP and IP) from the packets to determine the current service level of the flow and then groups the packets into a specific traffic flow. The current service level as determined by correlator 252 is performed by measuring several traffic characteristics during a TCP transaction. For example, correlator 252 determines the round trip time ("RTT") incurred on a network, and hence, this serves as a measure of latency for the network traffic. FIG. 7 shows how a correlator of passive flow analyzer 155 of FIG. 6, placed near a source (i.e., client's source address), can determine the network latency ("NL") and server response time ("SRT") for a TCP traffic stream.

Correlator 252 of FIG. 6 determines NL, for example, by estimating the difference 831 of FIG. 7 in time between a TCP SYN packet and its corresponding TCP SYN ACK packet. The difference in time between SYN and SYN ACK 831 is a rough estimation of the RTT excluding the small amount of time 829 that the server takes to respond to SYN. The SYN ACK packet is handled in the kernel of most operating systems and is generally assumed to be near zero. For each new TCP stream that is initiated from the source, correlator 252 can observe a time instantaneous value for network latency.

Percentage packet loss is calculated by correlator 252 by maintaining the state of all of the retransmitted packets that occur. From this value, correlator 252 calculates percentage packet loss from a total count of segments sent.

Correlator 252 also determines SRT 832 of FIG. 7, for example, by estimating the delta time between the HTTP GET message and the first data segment 833 received and then subtracting the previous value for the RTT. This assumes that the previous value for the RTT has not changed beyond an operable range since the TCP handshake occurred. The measurement shown by 834 indicates that measured congestion increases in the path as SRT 832 correspondingly increases. For purposes of this example, it is assumed that the data segments in the initial HTTP GET are sent back to back.

SRT 832 determined by correlator 252 depends on its location along the path which the traffic traverses. If passive flow analyzer 155 of FIG. 6 is on the client side, server response time 832 can be estimated as the delta in time between the HTTP GET Request message and the first data segment returned minus the RTT observed before the GET Request. If passive flow analyzer 155 is closer to the server side, the estimation is essentially the delta in time between the GET Request and the response. Congestion estimations are also possible by using the TCP Congestion Window ("cwnd") and by identifying the delta in receive time between segments that were sent back to back by the server, where the TCP congestion window controls the number of packets a TCP flow may have in the network at any time. Correlator 252 is electrically coupled to provide the above determined exemplary flow characteristics to aggregator 253.

Aggregator 253 primarily operates to group all flows going to each set of specific destinations together into one grouping. Aggregator 253 uses the service level statistics for each of the individual flows, received from Correlator 252, to generate an aggregate of service level statistics for each grouping of flows which are to go to the same destinations in the network, or the Internet. Aggregator 253 is also coupled to store such aggregated (i.e., grouped) traffic flow characteristics in storage 161. Traffic flow characteristics (or traffic profiles) are then used for future statistical manipulation and flow prediction. In a specific embodiment, storage 161 is the equivalent, or the same, as storage 162 of FIG. 2.

The granularity of the destinations is the same as the granularity of changes that can be made in the routing table. Nominally, service level manager 100 of FIG. 2 could install routes with prefixes longer than /24s, though the general practice is not to do so. Aggregator 253, therefore, will start aggregating flow statistics at the /24 level (i.e., class C networks) and continue all the way up to the /8 level (i.e., class A networks) into a data structure, such as a patricia or radix trie, or a parent-child data structure, or the like. In this way, it is possible to seek very quickly the necessary granularity of the routing change that needs to be made to ensure the service level is met.

Aggregation techniques employed by aggregator 253 are used to maintain the service level manager 100 of FIG. 2 to acceptable performance service levels, such as agreed upon in a SLA. Since Internet performance has been shown not to follow conventional statistical distribution, such as Gaussian or Poisson distribution, average calculations for service levels across all flows are not reliable measures of a typical performance behavior during a pre-determined time interval. If the service level agreement (SLA), however, states that the average service level must be maintained, then the outlying occurrences of poor performance will cause the average to be skewed, thus requiring corrective action to restore the minimum service levels being offered. A meaningful way to describe typical service levels being offered across all flows is to use median values, rather than average values. A person having ordinary skill in the arts will appreciate that either technique is possible and will depend on the definition of the service level that must be maintained.

Service level analyzer 254 is coupled to aggregator 253 to receive the aggregated flow characteristics associated with each grouping of destinations, and is configured to receive input service level parameters in which the performance must not fall below (i.e., minimum service level). The input service level parameters are the service levels that must be maintained, for example, by traffic type. Service level analyzer 254 operates to interpret the flow information for each of the groupings and provides feedback to the network control element, such as controller 166 of FIG. 2. Controller 166 initiates the necessary routing changes to configuration element 172 and then assesses previous routing changes.

Exemplary service level analyzer 254 monitors each of the aggregated flow statistics from aggregator 253 over a pre-determined interval of time, and if the service level is not being maintained within acceptable input service level parameter limits, then the service level analyzer 254 communicates such a condition to notify the controller 166 of FIG. 2 that the service level for a particular prefix (or traffic type) or classification is not being maintained.

Service level analyzer 254 waits for positive feedback from controller 166 until a change by configuration element 172 has been made. Once received, service level analyzer 254 clears all previous aggregated state or states for that prefix and starts the analysis interval over again. After the analysis interval is complete, service level analyzer 254 determines if the routing change has alleviated the condition. Service level analyzer 254 then provides the appropriate feedback to controller 166 which will make another change, if necessary. This process is repeated until the problem is escalated out of the region or the service level is met.

FIG. 8 depicts an example of another embodiment of the present invention. In FIG. 8, an exemplary network path optimizer 150 is shown. Network path optimizer 150 obtains visibility into the connected network providers and selects among a series of alternative providers available through rich path diversity at an aggregation point. Network path optimizer 150 alters the regional ingress point on a network by manipulating routing policy advertised to the connected providers, or alternatively, by manipulating the source address and using the diversity of the routing policy already in use. The visibility into connected providers is enabled through a series of active mechanisms (e.g., probes) that attempt to calibrate each provider and all provider interconnection points, such as peering points.

Network path optimizer 150 operates, in part, to modify an ingress path when service levels cannot be attained. Typically, an ingress point into a network is determined largely by the advertisements made to downstream providers as well as the policy that network providers set up and advertise to the eventual ISP that is hosting the destination. The degree of path diversity available in the network, however, decreases the closer you get to the destination. Most destinations on the network have but one connection to the network, though some servers are multi-homed to the network through several providers. The same path diversity constraint is apparent on the return path as well, in fact it is more pronounced since ingress into a network is statically determined by the routing policy of the downstream providers. In general there is only one return path into the network regardless of the egress path selection made by the system.

This may represent sufficient path diversity to enable service level enforcement, especially for applications like outbound content delivery, where most of the network performance requirements are outbound. Return path problems are even more significant in the face of severe outages. Since network path diversity is critical to the operation of the system, modification of the ingress path should be attempted when service levels cannot be attained. Thus, the network path optimizer 150 operates to provide alternative ingress path or paths for meeting minimum service levels.

Network path optimizer 150 includes router 159, calibrator 175, statistics repository 178, optimizer 180, and configuration element 181. Network path optimizer 150 functions to optimize the routing tables associated with router 159 coupled to a large number of destinations. To do so, network path optimizer 150 uses long lived data collection stored in statistics repository 178. Optimization of the routing tables is performed by optimizer 180, for example, by using an optimizing algorithm.

Calibrator 175 is coupled to router 159 to inject high speed, high volume active probes 176 to scan and collect information from all reaches of the Internet, or to a specific destination requiring optimization. Results 160 from these probes are returned to calibrator 175, which is configured to store results 160 in statistics repository 178. Probes 176 characterize the path in both directions and can distinguish between problems inbound to router 159, or outbound from router 159.

Exemplary optimizer 180 is coupled to receive statistics 179 from the statistics repository 178. Statistics 179 include one or more statistics, such as the latest received probe results 160, or previous, long live probe results, and/ or a combination thereof. Optimizer 180 uses one or more algorithms to determine the optimized routing for all destinations that are of interest. Such optimized routing information is provided to configuration element 181 so as to optimize associated router 159's routing table. Any changes to the default routing behavior of the routing tables are changed by configuration element 181, which injects the optimization changes to the routing policy or routing table on router 159. In a specific embodiment of the present invention, configuration element 181 is structurally and functionally equivalent to configuration element 172 of FIG. 2. Thus, network path optimizer 150 provides for an optimized ingress point into the network.

Optimization of the routing table, by optimizer 180, can be done for any prefix that has long term statistics available from the stats routines. "Long term" refers to a predefined period of time typically longer than at least the predetermined interval described with the active probes above. The optimization is done on an interval basis and routing decisions that it makes are at a preference of "150," which is higher than the default routes ("preference 100"), yet lower than any routes overridden due to passive analysis performed, and the subsequent reaction to service level violations ("preference 200"or above). Passive analysis, for example, is performed by a passive flow analyzer according to the present invention. Optimization is performed, for example, through a series of constraint based linear optimization algorithms where the constraints are selected among network loss, network latency, network jitter, available bandwidth, link or provider cost, or other constraints. Optimized routing changes are communicated to the network using the local route servers or other configuration elements (e.g., such as setting a route map).

Figure 9:
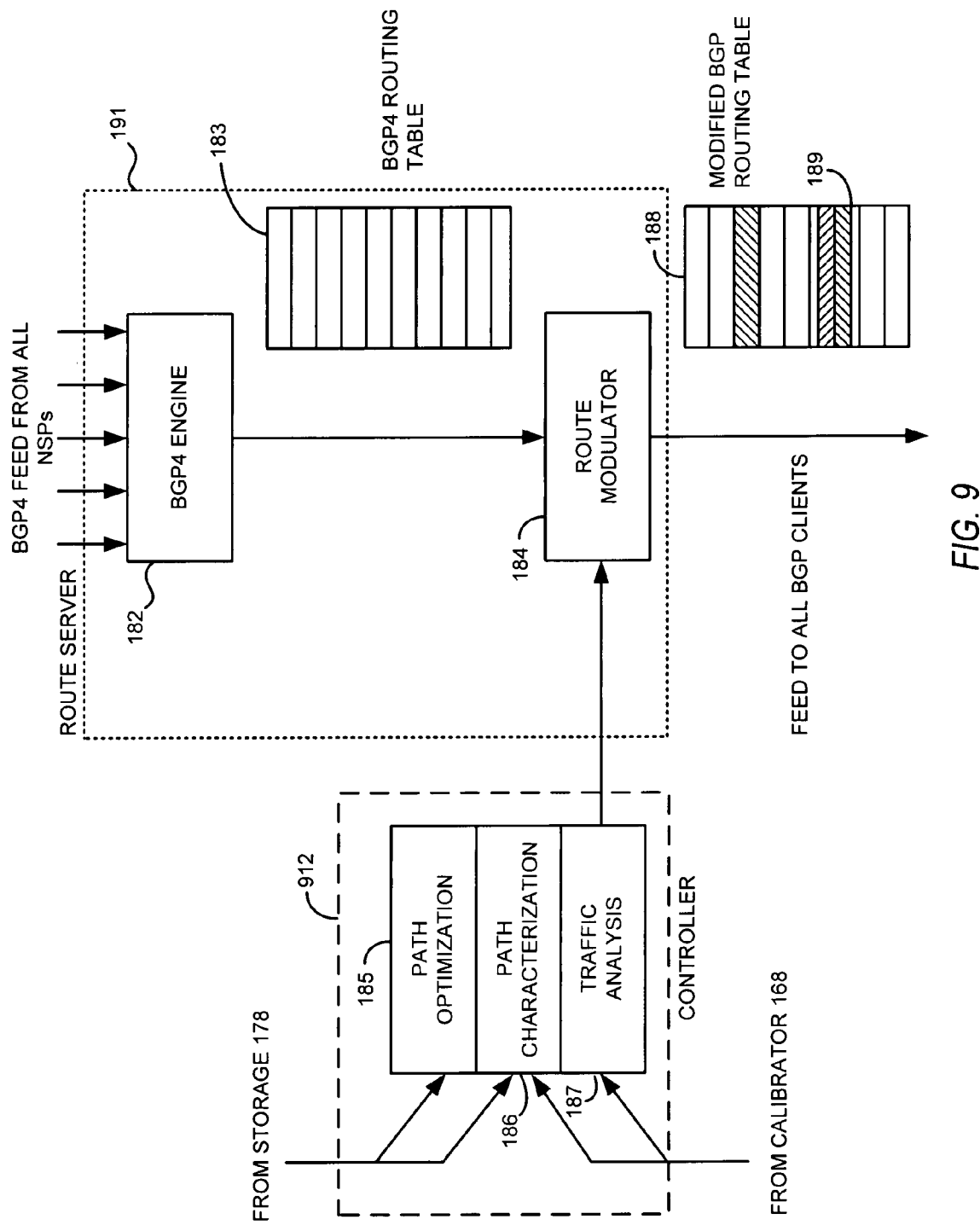
FIG. 9 is a detailed block diagram of a route server using a route modulator according to another embodiment of the present invention.

FIG. 9 shows an example of yet another embodiment of the present invention, where route modulator 184 is used to modify default routing behavior, for example, in a local POP. Route server 191 ("RS") receives full routing tables of the Internet from default BGP4 feeds into BGP4 Engine 182 from all of the local transit providers. BGP4 Engine 182 integrates all of these routes into a single BGP4 routing table that includes all of the best available routes 183. Route modulator 184, as a configuration element, is configured to receive one or more BGP4 routing tables 183 from BGP4 engine 182 and is further configured to receive one or more control signals and data resulting from the control processes of controller 912. Route modulator 184 is informed by controller 912 of the necessary changes that need to be made to default routing table 188. Then, the route modulator incorporates one or more of the following changes in the modified routing table 189: one or more optimized paths 185 as determined by optimizer 180 of FIG. 8; one or more characterized or monitored paths 186 (i.e., probed paths) as determined by calibrators 168 and 175 from FIG. 2 and FIG. 8, respectively; and instantaneous service levels 187 and other information provided by passive flow analyzer 165 from FIG. 2; or other information that provides for route modulated routing tables. Thus, route modulator 184 operates to modify BGP4 routing table 183 and to generate one or more modified BGP4 routing tables 188. Modified BGP4 routing table 188 includes changed routing 189, advertisements of more specific routes 189, etc. New modified BGP4 routing table 188 is then fed to all BGP clients in the network, who then use it to guide traffic to the destination.

For a given source address, the ingress point into a network is determined typically by the advertisements made to downstream providers and a policy that is set up by such providers. Eventually, the Internet Service Provider ("ISP") that is hosting the destination will receive such advertisements. At steady state, there is generally only one selected route back to the source address as shown in FIG. 10.

Figure 10:
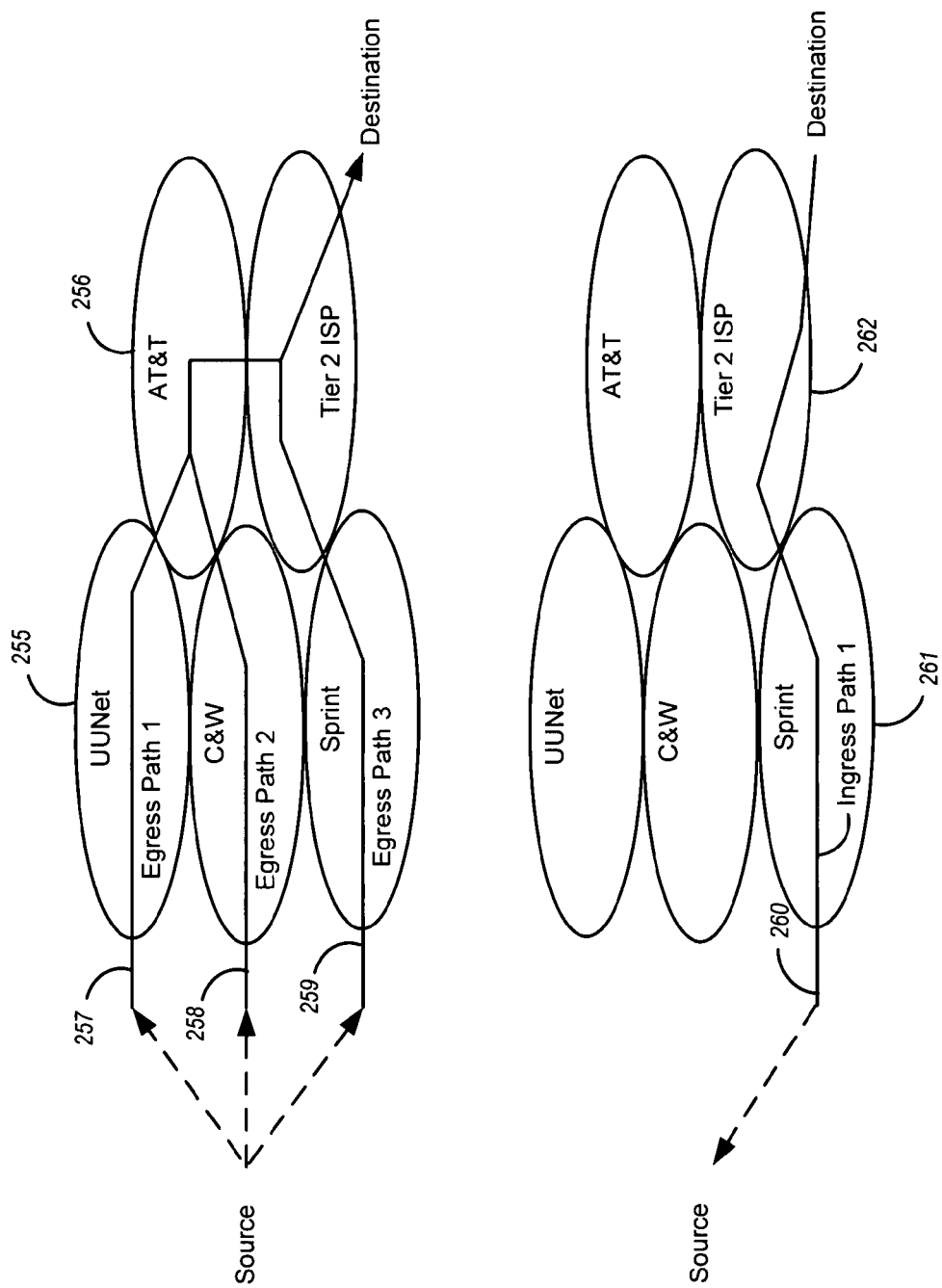
FIG. 10 is a simplified network diagram of egress paths and a corresponding ingress path according to conventional routing techniques.

FIG. 10 shows that without modulating the source address of a packet, merely changing the egress path for a given destination does nothing to change the return path back to the source. For example, changing the routing advertisements by pre-pending AS numbers to the AS path will generally have an effect only on the next hop AS and not downstream from that AS. While this does afford some flexibility in the ingress point of the network it will not propagate downstream to the next hop providers and may not afford sufficient ingress path diversity to meet the minimum service levels in the event of problems in those downstream ISPs. Additionally, it may detrimentally affect traffic that it was not intended to affect, and constraining or even understanding the results of the pre-pend is difficult and will require substantial effort and use of resources.

FIG. 10 also shows three separate paths to the destination via five different ISPs. Egress path one 257 and egress path two 258 have an AS path length of three and egress path three 259 has an AS path length of two. Changing only the next-hop address at the source can send the traffic down any of these three paths to the destination. Without modulating the source address, however, the return path back to the source is always via the ingress path one 262, despite the path selected towards the destination. If the path was selected by using BGP, the path shown through AS 261 and AS 262 is preferred since the AS path length is two instead of three, where three is a less desirable path length of the possible paths.

If changing the advertisements for a specific source address does not afford enough ingress path diversity as shown in FIG. 10, modulating the source address does facilitate network path diversity. For example, Network Address Translation ("NAT") is commonly used to share a single source address among multiple sources. NAT is the facility which translates all the source addresses and port numbers in IP packets originating from the unregistered private network to the public IP address of the host running the NAT software. NAT will allow systems on a private network to share the single registered IP address to access network services such as ftp, telnet, email and the World Wide Web.

Figure 11:
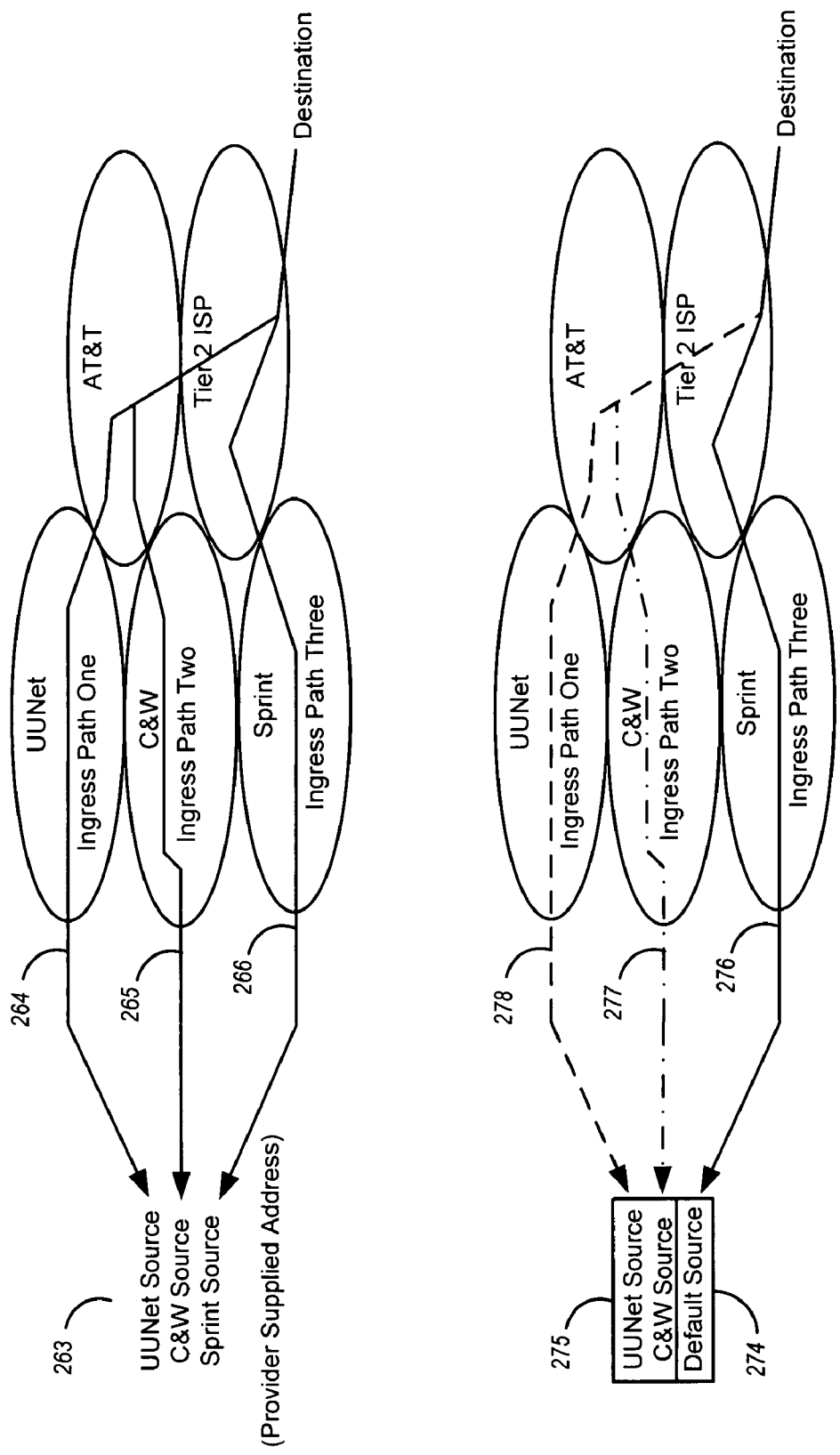
FIG. 11 is another simplified network diagram of egress paths and corresponding ingress paths according to the present invention.

FIG. 11 shows how by modulating the source address of a packet to a provider supplied address 263, the return path back to the traffic source can be modified. The source address 263 is advertised to a number of distant downstream ISPs and each path (i.e., route) to the destination address and back to the source address is significantly different. Ingress path one 264 shows a path that is taken back to the UUNet™ source address, ingress path two 265 shows a path that is taken back to the C&W™ address, while ingress path three 266 shows a path that is taken back to the Sprint™ source address.

A default source IP address 274, which is publicly routed, might be used for the majority of the advertised traffic that would take ingress path three as 276 the default return path. But if the return path, for example, became congested and unable to meet the minimum service level, by modulating the source address to indicate source IP address 275, alternative ingress path one 277 and ingress path 278 become available to accommodate the minimum service level. Modulation of the source address occurs by first recognizing that the traffic that needs a new ingress point into the network and then determining which of the ingress points is the best. Second, the best ingress point is placed into a policy for translating the source address into the IP space of a downstream provider. This space is routed very differently in the global Internet and ingress path diversity is achieved.

A typical application for NAT permits the originating source address is in some private IP address space and is not connected to the Internet, such as a RCF 1918 space, wherein the translated address is in public routable space. In this instance, NAT can be used to significantly change the way that traffic is sent towards the network. NAT is acceptable for most applications and the policy that enforces NAT can prevent NAT from breaking the relevant applications for which NAT is unacceptable. NAT, however, is intrusive to some applications on the Internet, such as Voice over IP (i.e., H.323 protocol), and security protocols, such as IPSec (IP Security Protocol) used to protect client information over IP. These applications might be denied the ingress path diversity provided and might be forced into a sub-optimal network path. Additionally, changing the source address in the middle of an active flow might disrupt that flow. Other embodiments of the present invention described herein can be implemented to overcome the NAT's disruption of active flows. For example, a service level manager of FIG. 2 might be implemented to verify that no active flows to that destination are in progress before the NAT policy is applied.

Figure 12:
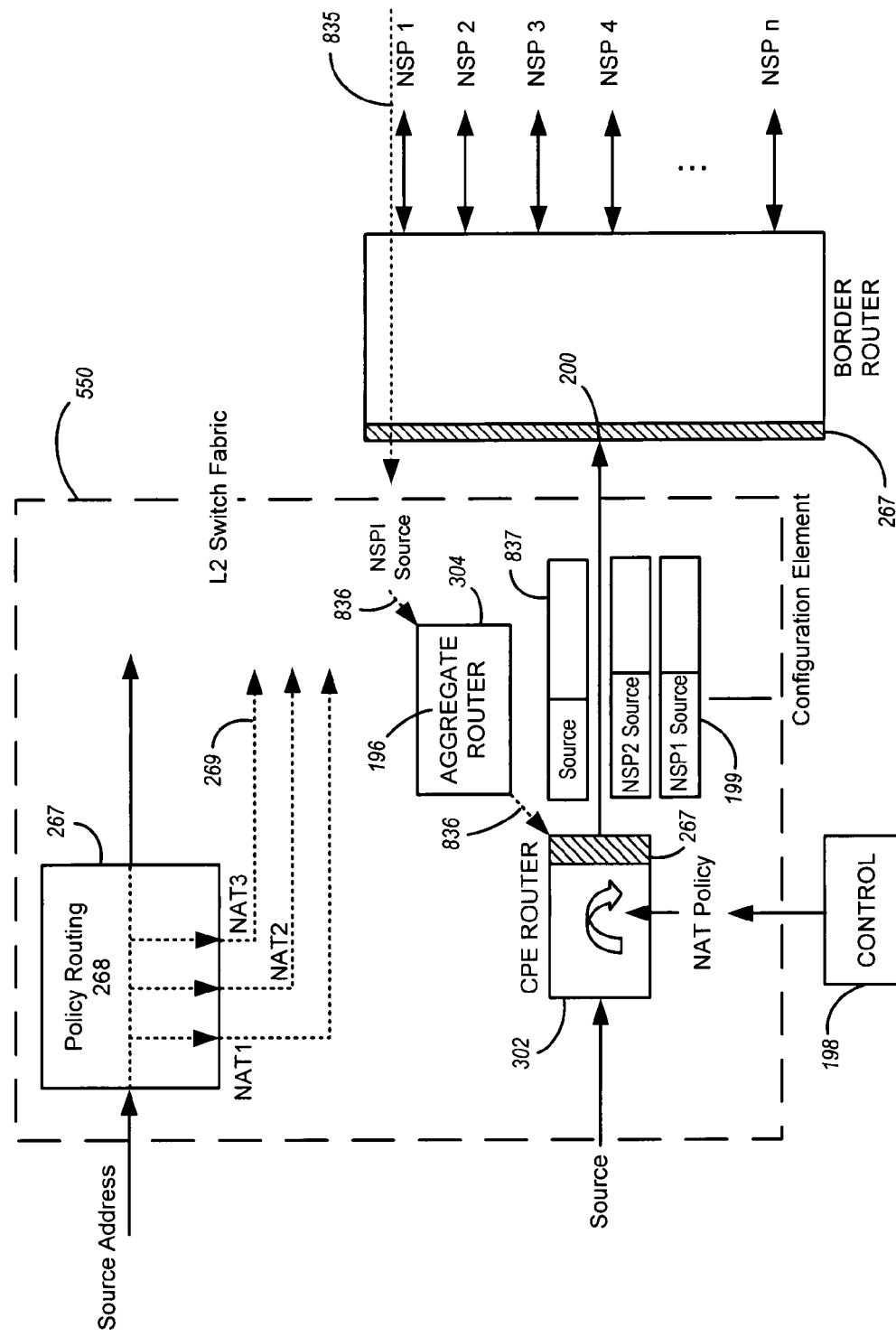
FIG. 12 is a detailed block diagram of a configuration element according to yet another embodiment of the present invention.

One embodiment of the present invention is shown in FIG. 12. FIG. 12 shows a detailed diagram of an exemplary configuration element 550 that operates to change a source address of a packet, and in doing so, modifies the return path that the traffic takes back into the network. Exemplary configuration element 550 need not be limited to only one physical component and might include one or more physical elements, and also includes software. For example, configuration element 550 might comprise one or more routers, interfaces, switches, etc. Although FIG. 12 illustrates an ingress route modulation system of the present invention, one having ordinary skill in the art should appreciate that the route modulator might also be an egress route modulator.

Referring back to FIG. 9, an exemplary controller 912 is included in a local system, and takes its inputs, for example, from a series of faststats or high resolution stats that have run for a sufficient interval over all possible local providers to the destination. The results are aggregated and a control decision is made based on the quality of the results from each provider. The selection is based on a series of constraints such as available bandwidth on the outbound link, loss experienced over the provider, latency experienced by the provider, jitter observed over the provider and eventually the cost to use the provider. If several providers are meeting the minimum service level, it is acceptable for the system to make a decision based on transit cost.

The available bandwidth on the link can be determined from the running averages of link utilization that are being calculated and stored by other processes in the system for network management purposes. The amount of traffic that is currently being sent to that destination represents the amount of bandwidth required from the new provider link. An assumption might be made that if there is sufficient bandwidth available on the next hop link, then the downstream provider has sufficient bandwidth available in the system to accommodate the new traffic. Passive analysis 187 performed by the passive flow analyzer, however, will note degraded service if this assumption turns out to be false and appropriate action can be taken on another provider. The bandwidth being consumed to the destination will be available from the passive analyzer which is able to observe the characteristics of all traffic traversing the system.

In a specific embodiment, controller 912 receives information from the passive flow analyzer regarding the nature of the traffic classification that is not meeting the minimum service level. Traffic classification is discussed below. Different classes of traffic require different service levels. Based on the nature of the traffic classification, as determined by a passive flow analyzer, the control decision is made on the appropriate characteristic of the network performance be it loss, latency, or jitter, or some combination of all three. Once the network path has been determined, a controller 912 informs its episode manager (see below) of the prefix and next hop address to change in the appropriate routing table (VRF) or control informs the network that an ingress must change and enables that change through the NAT policy engine on the CPE or Aggregation router.

Ingress Route modulator 184 is configured with several provider supplied addresses (NSP1, NSP2, ... NSPn). A small amount of address space is acquired from each of the downstream providers and is routed towards the infrastructure via the connection to that downstream provider. For example, NSP1 is routed by the service provider into the network including a route modulator 184 via the provider supplied transit connection 835. The provider address is routed internally through the POP to an interface 836 where the NAT is applied 836, for example, either on a router at the customer premises 302 (i.e., a customer premises equipment router or "CPE") or an aggregation router 304 in the POP. Each particular interface 836 will have a separate NAT policy corresponding to the NAT address of the downstream provider.

The address is applied to a network address translation configuration 269 (NAT1, NAT2, NAT3, ... ), and the customer traffic is routed to that interface 836 according to a policy 268 that specifies which traffic is supposed to take a different reverse path. The policy-based address translator component 267 resides, on the same router that enables the NAT configuration.

Policy 268 is applied by the local control process of controller 198 which determines that the ingress path into the network is not meeting minimum service levels, for example, as a result of performing passive traffic analysis. Controller 198 then determines the best ingress path to select and does this, for example, using multipath calibration techniques, as described above in connection with the use of active probes.

The traffic that does not match policy statement 268 is unaffected and maintains normal source address 837. The traffic that does match policy 268 is subject to NAT. When an ingress path must change for a particular destination, policy based routing 268 is applied for that destination to reroute the source traffic through interface 836 on the CPE 302 or aggregation router 304 that has a NAT policy applied. Once the NAT interface sees the new traffic, the outbound source address is changed to the provider address and the traffic is sent on to the destination. The outbound source address then is new source address 199 and is routed back into the network differently than the original traffic. At the destination, the return traffic is routed back to the provider source address, creating a different path for return traffic from the default path. This function could also be encapsulated at the ingress interface of the border router 200 and need not be a separate policy on a different router. It should be understood that the entire process could be integrated as part of one router according to the present invention.

FIG. 13 illustrates a specific embodiment of the present invention where exemplary route servers 191 are used to make regional or wide area networking changes to the default routing table (i.e., with one or more modulated source addresses). FIG. 13 shows two regions 310 and centralized route server 525 that implements decisions for both regions 310 by determining BGP policy among several local POPs in a region. Each region 310 is configured to include one or more elements depicted in FIGS. 2, 8 and 9, and includes local route server 191. It should be understood that many more regions and a corresponding hierarchical structure of central route modulation is possible. For example, a parent central route server might be coupled to one or more child central route servers. In turn, each of the child central route servers might be coupled to one or more regions. Furthermore, although centralized route server 525 is depicted as handling egress traffic, it should be understood that the system shown in FIG. 13 also might be configured to handle ingress traffic.

Router 190 is configured to operate as an iBGP client of route server 191 and is configured to receive external BPG feeds from local providers. Such eBGP feeds are correlated into a RIB that contains all locally communicated routes. Route servers 191 are configured to communicate information using iBGP back to the local POP routers 190 with all routes at a higher preference than the external routes from the local providers. Thus, any routing changes that route server 191 makes will be preferred over the local routes being heard from the providers.

Passive flow analyzer 195 is configured to receive traffic and traffic information to verify that customer traffic is meeting minimum service levels. Exemplary passive flow analyzer 195 is as described as passive flow analyzer 165 in FIG. 2. An active calibration process is performed by calibrator 837 as described in connection with FIG. 2 that characterizes (using probes) the quality of all local paths to the Internet. Calibrator information 198 and passive flow analyzer information 196 are communicated to central storage 314. Each of the local route servers 191 also provide local routing tables 802 to central route server 525 in at least one of the POPs which uses standard BGP4 engine 316 to create one or more regional BGP4 routing tables 194. BGP4 engine 316 is similar to BGP4 engine 182 of FIG. 9.

In one embodiment, central route server 525 is coupled to provide regional BGP4 routing tables 194 to central route modulator 199, which uses the calibrator information 198 and passive flow analyzer information 196 from storage 314 to make region specific changes to the modified routing table 170 (i.e., for region 1). Such changes are then communicated via a network using internal Border Gateway Protocol ("iBGP") 200 to local route server 191. Central route server 525 also coordinates all changes being made by local route servers 191 and arbitrates decisions between the local POPs. Central route server 525 also functions to help a local POP find a better route when there is no local route that can meet the minimum service level. The routing decisions made by central route server 525, for example, are at a higher preference than local route server 191 decisions. Each of the local route servers 191 communicate new routing tables 170 to local routers 190 via a network using iBGP 201 between local route server 191 and local router 190.

In the event of route server 191 failure, all local routes that were originated by that route server will be withdrawn and routing will fall down to the highest available preference. For example, if central route server 525 fails, decisions will fall down to local route servers 191. If local route server 191 fails, routing will fall back to the default routing behavior learned from the local providers.

Exemplary preference values might be "100" for locally heard routes, "200" for a local route server route, "300" for a regional route server route, "400" for a national route server route, etc. This provides the hierarchy in preference and allows central servers 525 to arbitrate routes between local servers 191.

Central route server 525 also uses preferences to signal control processes in local POPs to gather input for non-local episodes. Episodes, according to one embodiment of the present invention, and how they are addressed are discussed below. If central route server 525 hears a community that signals the need for HELP, it downgrades the preference of that route to a value of "10" and re-advertises it to all of its (children) route servers 191. The local episode manager of controller (not shown) will interpret this as the need to gather input and resolve non-local service level violations. When the violation is cleared the central route server 525 communicates this by withdrawing the "10 preference" route.

Figure 14:
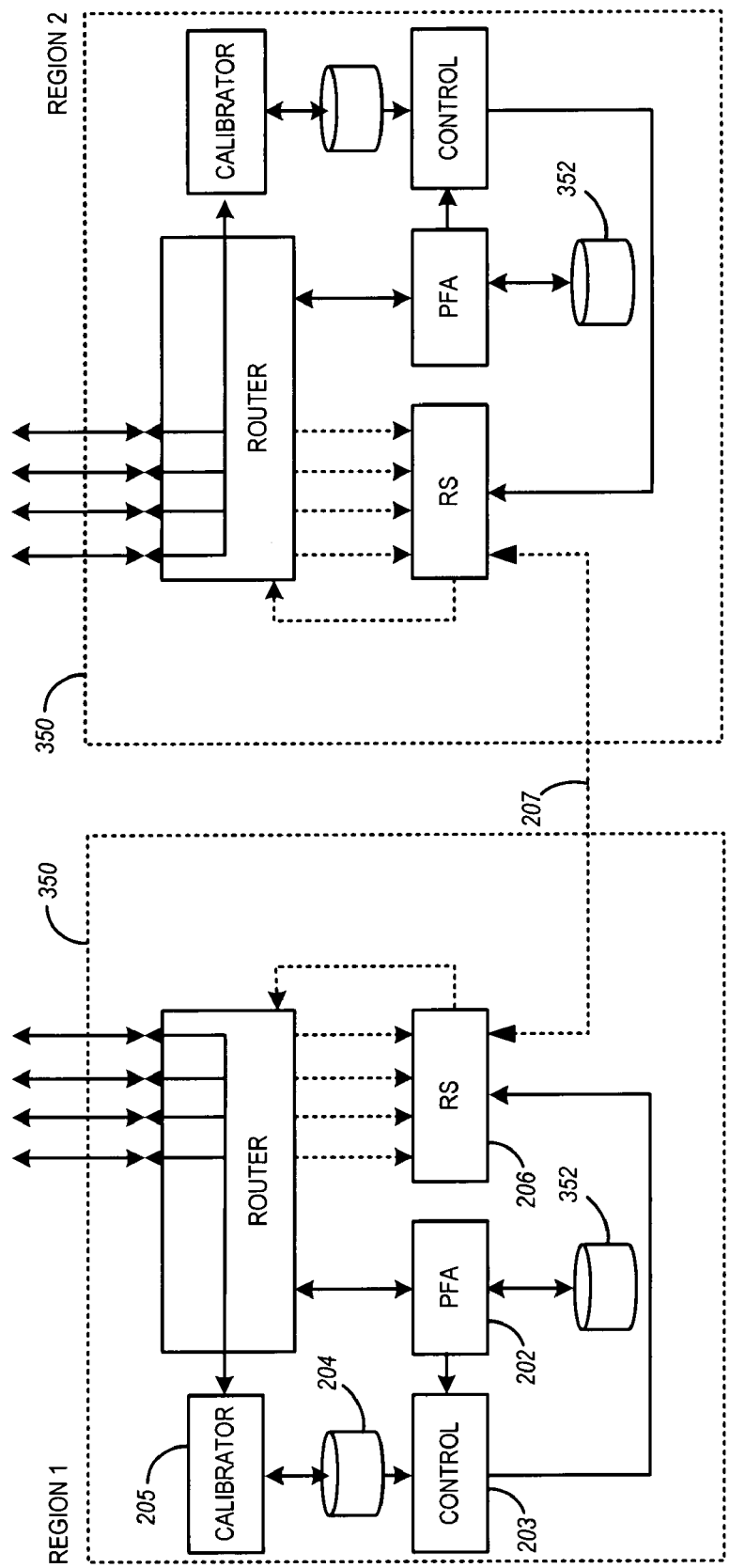
FIG. 14 is a block diagram of a system used to make wide area networking changes according to an alternative embodiment.

FIG. 14 shows a number of route servers 206 inter-operating between themselves to reach a consistent inter-regional routing decision. Each region 350 is configured to include one or more elements depicted in region 310 in FIG. 13. Each region 350 includes passive flow analyzer 202 and controller 203 configured to use statistics based upon the calibration information from calibrator 205 and passive flow analyzer information from passive flow analyzer 202. Such information is locally gathered and stored at local stats storage 204 and region storage 352. According to a specific embodiment of the present invention, route server 206 is configured to determine a metric for each destination based on local observations of the path characteristics. Such path characteristics include round trip loss, latency and observed jitter.

Route servers 206 determine each of the path metrics and are configured to exchange and advertise their local metrics 207 with other regions using a modified version of BGP4. According to this exemplary configuration of each route server 206 per region, each of the local decisions is based on local data and data collected from remote regions via other route servers over one or more interconnects 207. Inter-regional metrics are used between the regions to weigh the remote metrics with the cost to use the inter-regional network connection.

Communication between route servers 206 can be done through specific BGP community attributes. The specific communities, or regions, can signal the need for help, or help resolve a problem by using time instantaneous path characteristics (such as loss/latency) observed for a given route. One embodiment of the present invention uses a local episode manager (see below) to operate with the local control processes of controller 203 of FIG. 14 to guide this communication through the route server API of route server 206. Although only two route servers are shown, many more might be interconnected.

Figure 15:
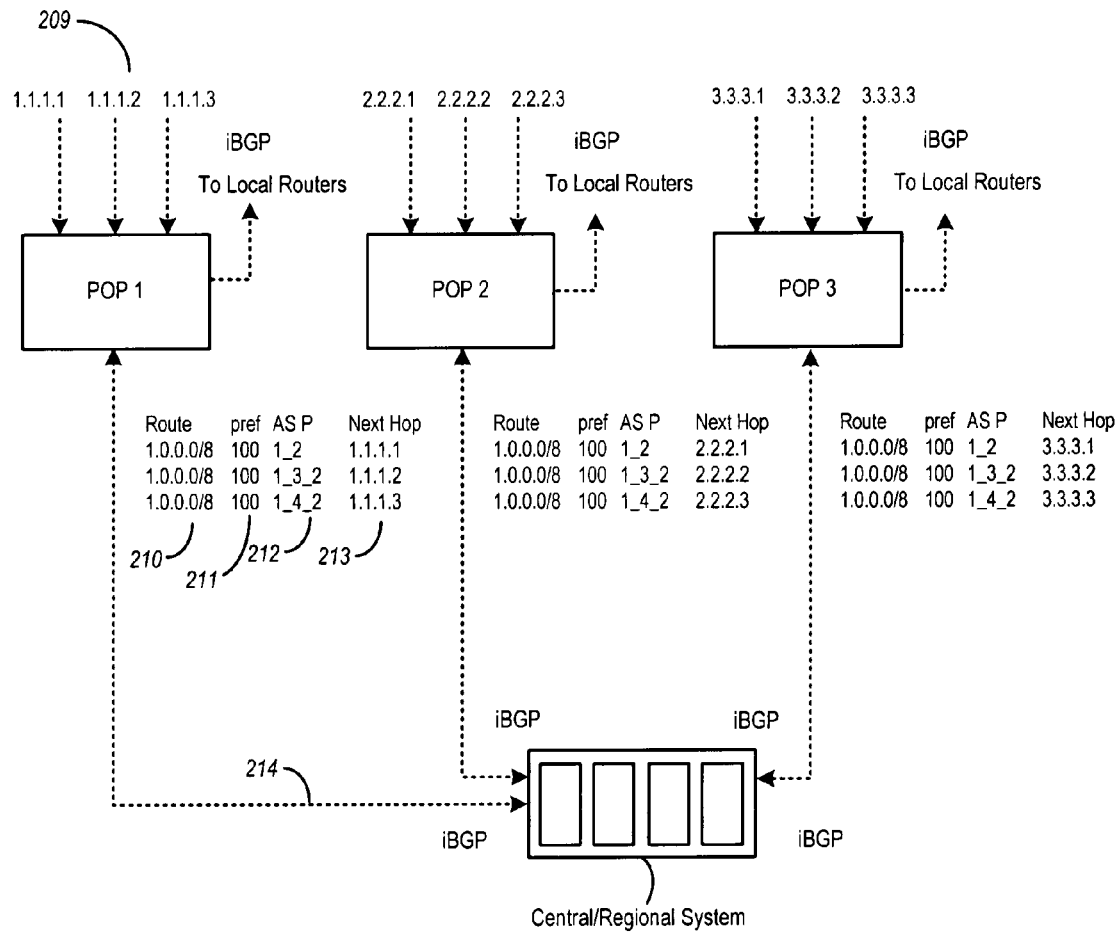
FIG. 15 is a block diagram of a multi-regional system operating according to the present invention.

FIG. 15 illustrates an initial state of a multi-regional system of route servers described in connection with FIGS. 13 and 14. Each POP has three available routes 209 associated with three different next-hop IP addresses (1.1.1.1, 1.1.1.2, 1.1.1.3). The system provides full routing tables from each ISP, and the routing table for the prefix shown (1.0.0.0/8) is listed for each POP. The routing table consists of a destination prefix 210, a route preference 211, an AS path 212, and the next-hop address 213. The local system communicates over a network to a central (or regional) network system using iBGP 214.

In one embodiment, the controller (not shown in FIG. 15) handles any and all service level violations, or episodes, and makes a better path selection for both egress and ingress paths. Episodes are described below. The control process of the controller is hierarchical in nature. If the control process running locally cannot resolve the problem locally it will escalate to the next level and ask the regional controller, and its control process, for help. FIG. 15 shows the lines of communication that the controller has with the other processes. Inter-POP and Inter-regional communication could be inter-process communication, though it is possible to piggyback this communication on the iBGP communication that is already occurring between local and regional route servers. The controller is notified of episodes (i.e. service level violations) through communication with the passive flow analyzers. The controller makes changes via the API into the config module (i.e., configuration element), for example, which is implemented as the modulator in the route server. This API specifies a prefix, a next hop and any and all BGP attributes that are necessary to communicate routing changes to the local and regional routers. The controller reads available routes in from the API of the route server on a per prefix basis. Also, a controller receives additional information about the available paths from the stats processes.

Figure 16:
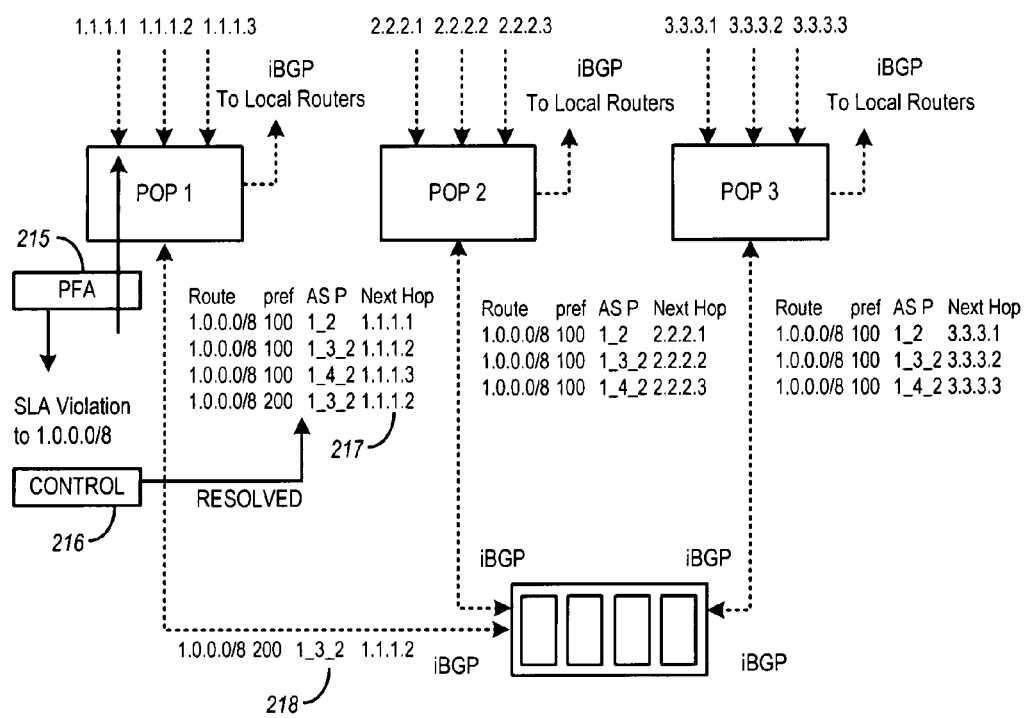
FIG. 16 is the block diagram of FIG. 15 illustrating one exemplary method of operation.

FIG. 16 depicts a local system and a structure to resolve local service level violations ("SLA") using a set of local paths which are available. In FIG. 16, an example shows that there is a service level violation to 1.0.0.0/8 out the existing (BGP4 preferred) route of 1.1.1.1. The service level violation is detected by local passive flow analyzer 215, which notifies local controller 216. Controller 216 analyzes the paths to 1.0.0.0/8 out of all local providers and determines if a route exists to reach the destination, such as via 1.1.1.2, thus resolving the SLA violation. Therefore, the local controller 216 modifies the local routing table and raises the preference of route 217 via 1.1.1.2 to "200" so that BGP4 prefers it instead of 1.1.1.1. This route is also communicated to the central route server using iBGP connection 218.

Figure 17:
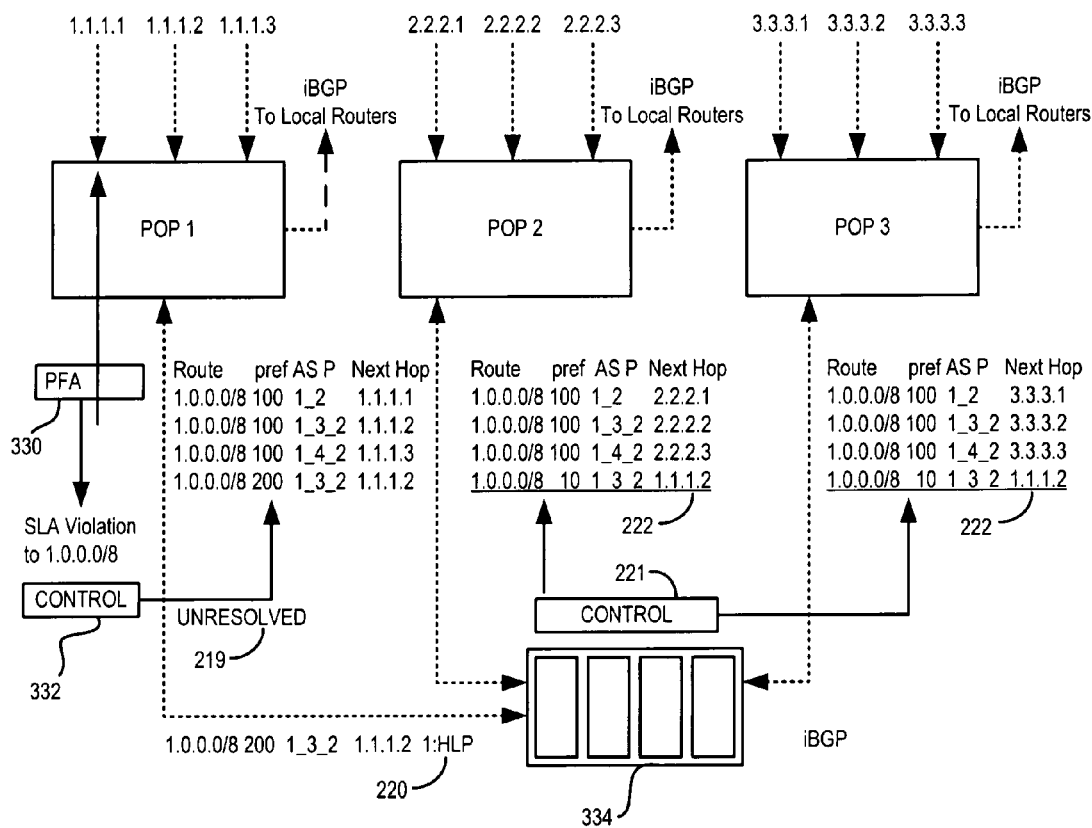
FIG. 17 is the block diagram of FIG. 15 illustrating another exemplary method of operation.

FIG. 17 shows an example of how a regional system reacts to service level violations which cannot be resolved locally. For example, there is a service level violation to 1.0.0.0/8 on route 219 that has been preferred by local controller 332. Passive flow analyzer 330 has determined that the service level has not been restored. Local controller 332 will try all of the local providers and if none of them can resolve the service level violation, the system will use the best available route 219, yet communicate the need for assistance to central route server 334 using BGP community attribute 220. Central controller 221 receives this route update and signals to all of the other POPs in a region using a very low preferenced route ("10 preference") to that destination 222, indicating that they all should try to find their best route to that prefix.

Figure 18:
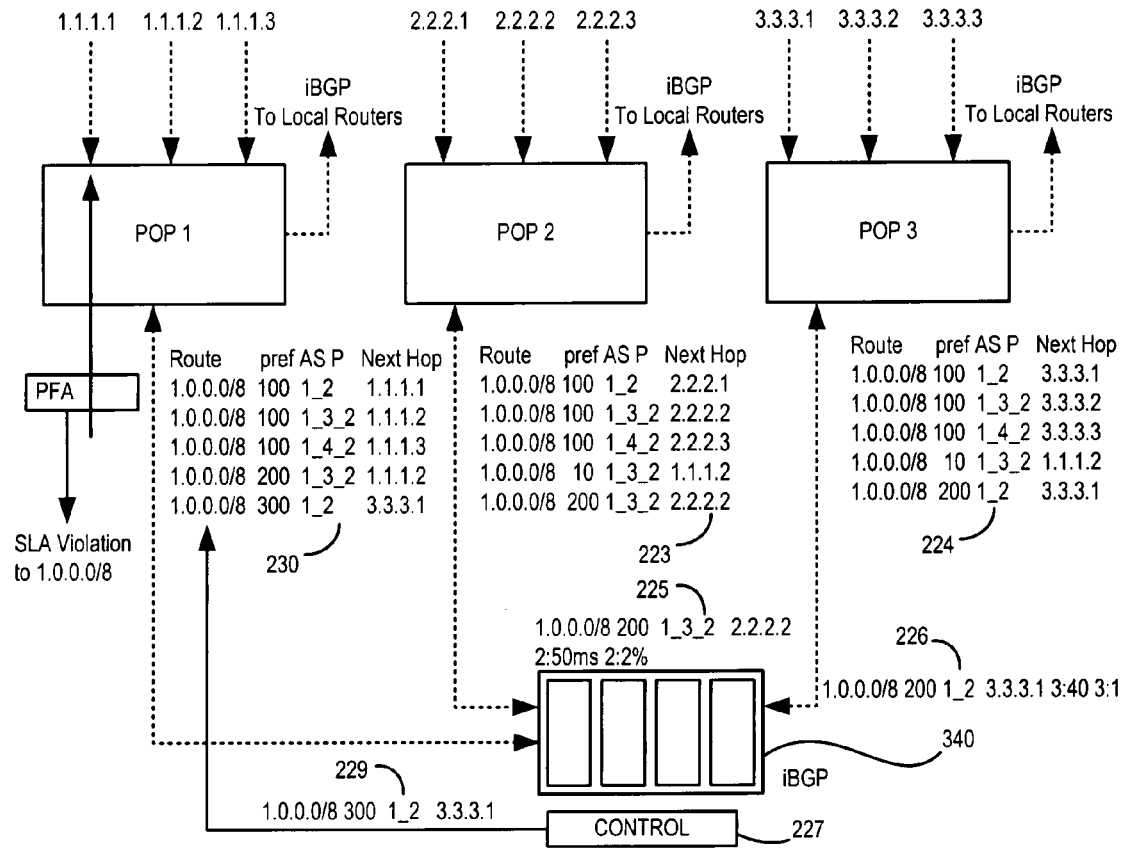
FIG. 18 is the block diagram of FIG. 15 illustrating yet another exemplary method of operation.

FIG. 18 shows an example of how one or more local POPs get involved in making regional routing decisions. For example, each local pop in FIG. 18 has been notified of a problem prefix through a low preferenced route addition to that prefix from central route server 340. Each local controller (not shown) detects all possible routes and starts the process of finding the best local route. Once found, the controllers then advertise it locally with a "200" preference, for example, as preferences 223 and 224.

Each local best route is also advertised back to central route server 340 through the iBGP connection with some additional information passed as BGP community attributes. The local controller indicates the time-instantaneous loss and latency values observed to the destination prefix in this community attribute. In the case of POP 2, the round trip latency is 50 ms with 2% packet loss. These values are communicated to the central route server 340 in the routing update 225. In the case of POP 3, the round trip latency is 40 ms with 1% packet loss, and this is also communicated in the routing update 226. Using this information, central controller 227 is able to arbitrate among the set of best routes from all of the local pops (i.e., POPs 1, 2, and 3) and advertise particular route 229 to all of the local pops with a higher preference of "300," for example. Once this route is installed in POP 1's routing table 230, all traffic to 1.0.0.0/8 will leave the local POP for POP 3 and exit with a next hop of 3.3.3.1.

Figure 19:
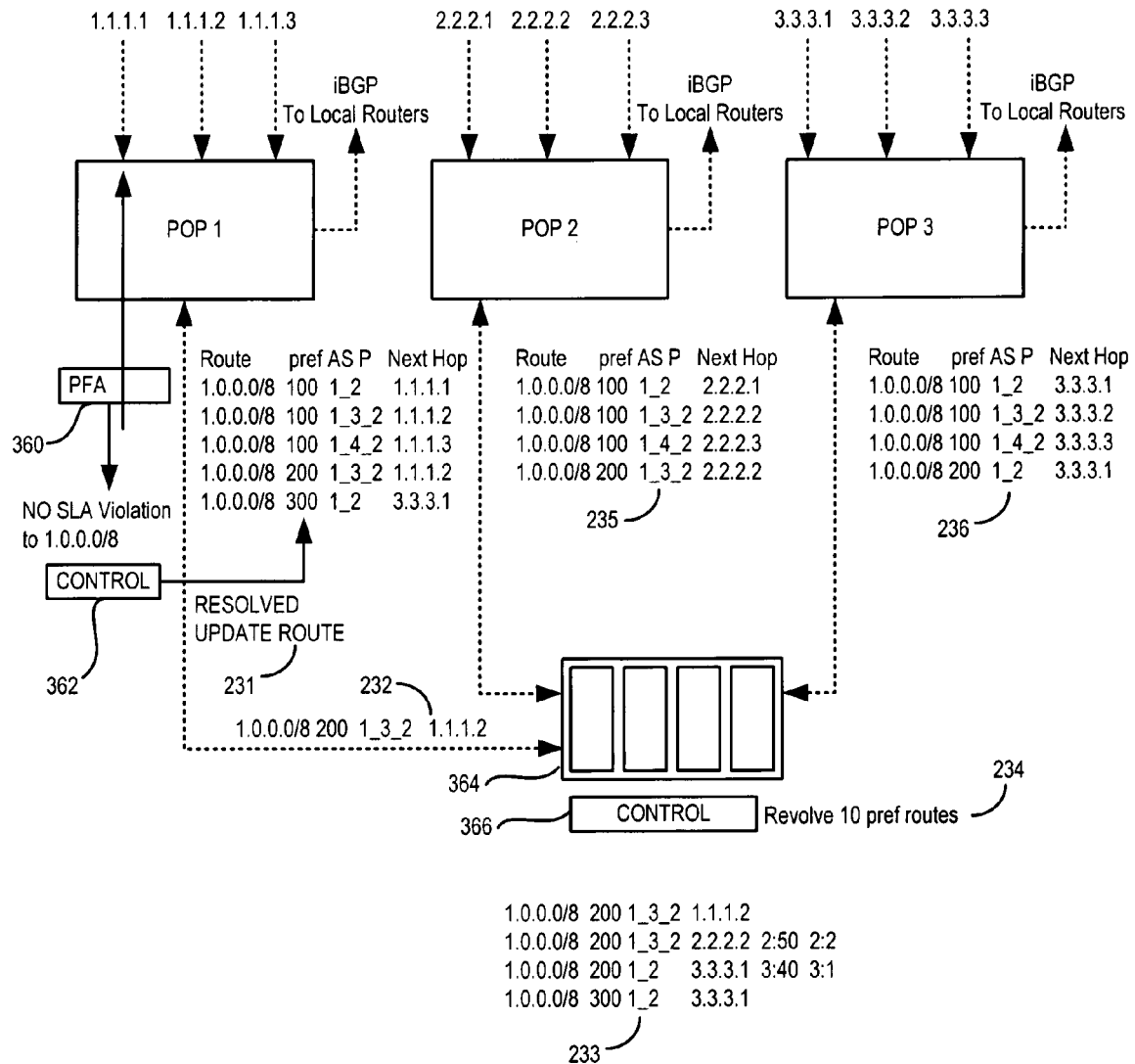
FIG. 19 is the block diagram of FIG. 15 illustrating yet still another exemplary method of operation.

FIG. 19 shows an example of how the system acknowledges that a routing change (i.e., a certain modulated source address or egress routing change) has restored the traffic to the minimum service levels. Once the regional route has been installed with a preference of "300," for example, passive flow analyzer 360 will verify the service level after a short interval. If the service level violation is resolved 231, controller 362 will update the routing entry to central route server 364 and remove the BGP community attribute or metric that had signaled HELP 232. This acts as positive acknowledgment that the routing change just made resolved the situation. Upon receiving this routing update and updating central routing table 233, central controller 366 signals the acknowledgment to the other POPs by revoking all routes with the "10 preference" 234, for example. When local routing tables 235 and 236 are updated, local controllers 362 will stop all attempts to find a better route to the prefix.

Figure 20:
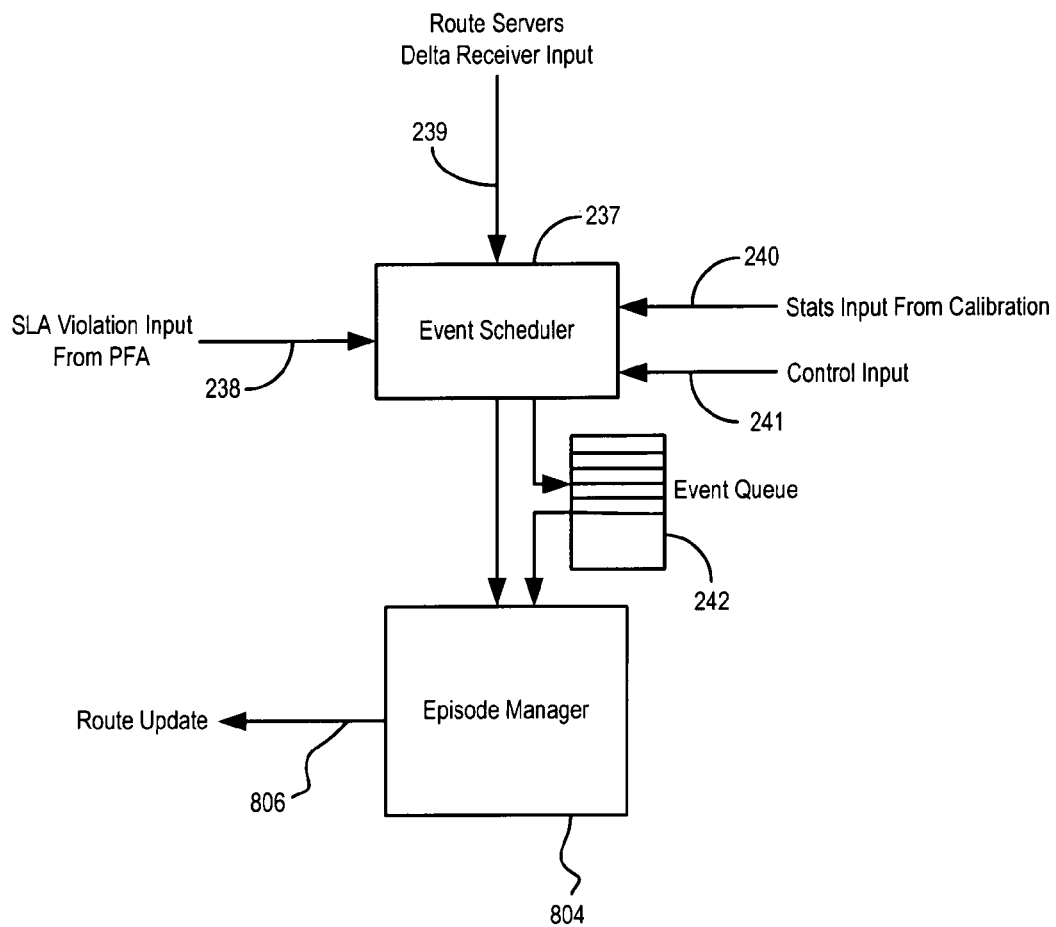
FIG. 20 is a detailed block diagram of an exemplary controller according to the present invention.

FIG. 20 illustrates a specific embodiment of the present invention where controller 166 of FIG. 2 and controller 166 of FIG. 8 include a further episode manager 804 of FIG. 20. Event scheduler 237 is configured to receive an output indicating a notification of an SLA violation 238 which, for example, is provided by a passive flow analyzer (not shown). Event scheduler 237 is configured to receive a delta receiver input 239 from a local route server (not shown). Delta receiver input 239 is a signal including information of all routing updates into the network system. Delta receiver input 239 primarily provides BGP messages such as Add, Remove, and Update.

If an instantiation of calibrator 168 is running (not shown), event scheduler 237 can be configured to receive results from active probes into the system through Stats Input 240, as provided by a calibrator (not shown). And if the controller in which episode manager 804 resides is running a control process, the controller can notify the system of a routing change (i.e., a modulated source address or new next hop to update routing tables) that should be made through control input 242. Each of these inputs is placed into event queue 242 for processing. Event scheduler 237 is able to prioritize certain events such as the clearing of service level violations over other events. This allows the system to better operate in the event of a disaster where a large number of service level violations are suddenly input into the system. If there is an event to be handled it is read from the event queue by episode manager 804 who eventually communicates the necessary routing changes 806 to the local route server.

According to a specific embodiment, an episode occurs when the routing in place cannot achieve a minimum service level to a given prefix. As noted earlier the passive flow analyzer notifies the system of an episode. In one or more POPs employing the present invention, the system or systems in which the POPs reside will attempt to resolve the episode locally by finding another local path to the destination that is able to meet the minimum service levels. If it is able to find such a path, a local controller will rewrite the local default routing behavior with the new route preferenced at "200." The route is sent out to all iBGP peers (including any local route reflectors) such that all routers in the local POP are made aware of the new route. The local route server also has an iBGP session with the parent route server in the region and in this way, the central route server is aware of the change as well.

If a local controller is unable to find a local path that meets the minimum service level, the controller will select the best path available, preference it at "200," but set a community attribute or metric that activates the central route server that help is required on the prefix in the advertisement. So, in this way the local route server will set a best route, yet inform others regions that the route is not acceptable.

When the central route server receives an advertisement that has the help community attribute, the central route server will advertise the same prefix to all children route servers (except the originating local route server) with a preference of "10." This value is far below the default value of "100" communicated from the eBGP sessions and will never be used as an actual route to a destination. This is favorable, since the route is not meeting the minimum service levels and the "10 preference" is a signal to the local systems that another POP requires help with this particular prefix.

When the local route servers receive an advertisement, they send the details of the BGP message along to the local episode manager of the controller. When the episode manager receives a new route that has a "10 preference," this is the indication from the central episode manager of the central controller that another POP needs help with this route. The local episode manager will then find the best local route to that prefix, and if it meets the minimum service level, advertise that route back to the central route server via a network using iBGP. The local episode manager will also encode the path characteristics such as loss and latency as community attributes on the advertisement. This will allow the central episode manager to arbitrate between responses from several different POPs.

When the central route server receives these advertisements, it determines if the advertisements were part of an existing episode, and if they were, the central route server will select the best advertisement in terms of path characteristics (in terms of loss/latency) sent in the community attributes. This route will then be advertised with a "300 preference" down to the local child route server.

The local passive flow analyzer should then determine if the new route is able to meet the minimum service levels, and if it is, the local episode manager will send a positive acknowledgment of this by updating the route advertisement. This time, with a different community attribute (e.g., "ACK").

Upon receiving this update, the central route server passes it along to the central episode manager. When the episode manager sees the ACK attribute it removes all previous routes sent to the children local route servers with a "10 preference," in other words, the central episode manager revokes all outstanding requests for help on this prefix.

If instead, the new route sent by central did not meet the minimum service levels, the central episode manager will get a timeout and then send an update with a route that has not yet been tried. This is repeated until all routes have been exhausted. If this condition exists, the central route server will signal its parent for help in much the same manner as the local POP did using a BGP community attribute. This will get other regions involved in the episode.

Another way to implement this is to allow all of the local route servers to communicate with each other or through route reflectors. This method is shown in FIG. 14. The same method of encoding time-instantaneous route characteristics as BGP community attributes could be used. Then the standard BGP4 decision tree could be modified to make path selection based on these metrics a very early decision, even before AS-Path length, for instance. This would allow all of the route servers to act independently and yet reach the same routing decision. Such a modification would be required for any apparatus as the hierarchical system requires too much policy to be in place for it to operate across more than a single provider. For the single provider scenario, the hierarchy implicit in the parent-child relationship makes the solution more scalable.

In one embodiment, a message-based system of communication could be used between parent and child episode managers instead of the state based communication that is encoded in the BGP attributes. This will allow the episode managers to communicate completely outside the of the normal BGP communication. Furthermore, an embodiment could be implemented such that the episode manager does not need to be aware of incoming BGP messages such as "Update" or "Withdraw." This completely de-couples the episode manager from any BGP communication. If a route that has been set by the episode manager is withdrawn by the downstream provider, then the route server is responsible for withdrawing the originated route and the routing behavior for that prefix falls back to default routing. If default routing is not meeting the minimum service level, a new episode will be created and resolved normally, though with a different route as the previous route is no longer available.

For inter-regional withdraws of the original route, it is desirable for the local route servers to maintain a full mesh of BGP sessions either directly or through route reflectors. However, it is also desirable for the advertisements sent by the episode managers to remain constrained to the local pop they were set in. The central episode manager will maintain which POPs need to see the advertisement and make that advertisement directly to the local route server. If the route servers are connected directly, a modification to the iBGP process where route removal messages are propagated to other route servers, but update and add messages are not. This allows very quick convergence of a withdraw message and still maintains the control of a centralized routing decision to selective POPs. For example, in route server 191 of FIG. 9, route server 191 maintains a certain state to receive a request to withdraw a route from the NSP feeds. If server 191 receives information that a modified route 189 has been withdrawn, route server 191 operates to remove the withdrawn route from modified routing table 188.

Figure 21:
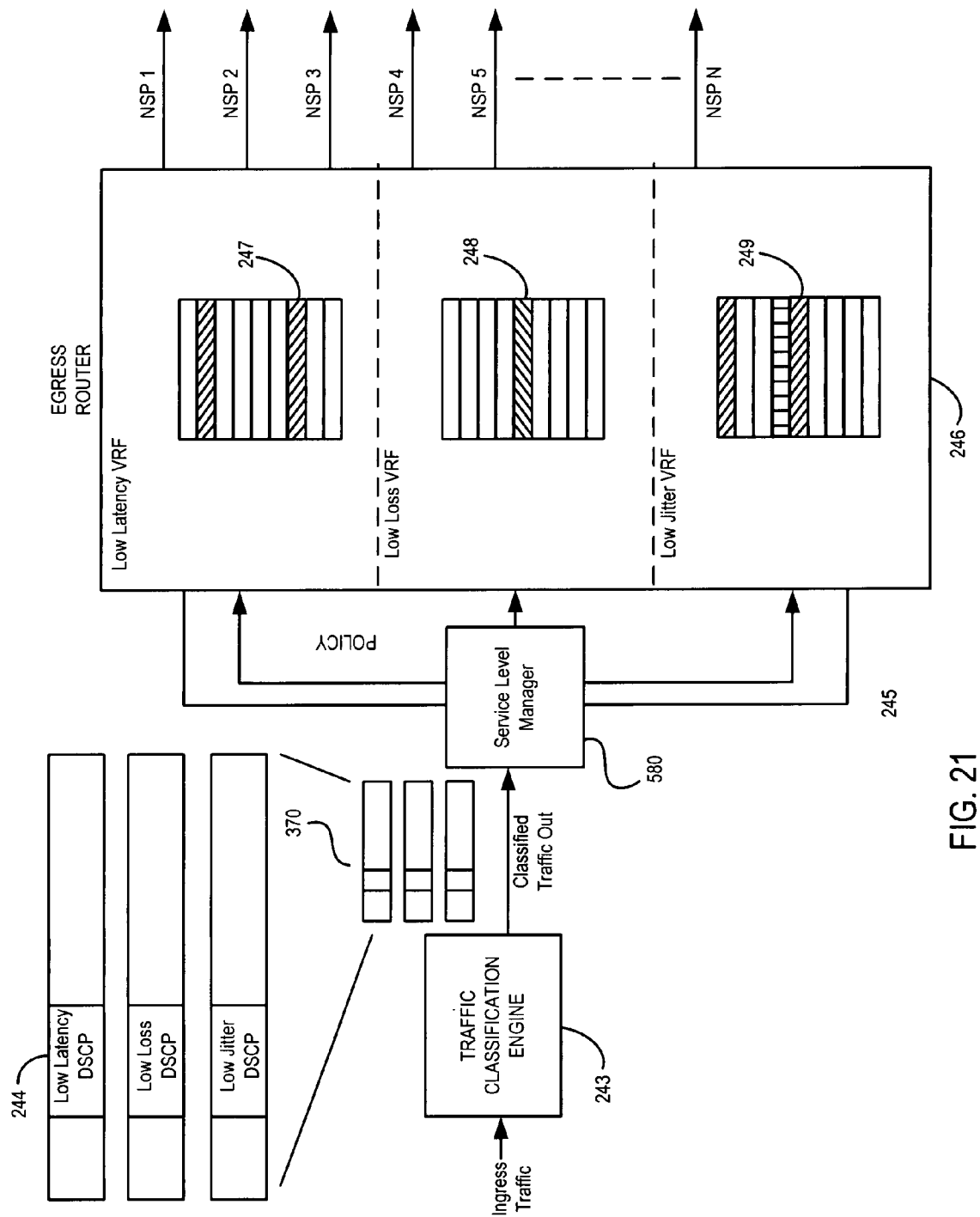
FIG. 21 is a block diagram illustrating the use of a traffic classification engine according the present invention.

FIG. 21 depicts an example of "application-aware" routing according to the present invention. "Application-aware" routing includes mechanisms to optimize performance of certain applications based upon requirements of the application. Traffic is classified on the ingress into the network system and each type of traffic is routed according to the requirements of the traffic. Traffic classification engine 243 monitors all traffic and matches it against a classification policy. Individual packets 370 are then classified by setting the Differentiated Services Code Point field in the IP datagram. The DSCP bits in each packet 244 can be set according to exemplary classifications such as low loss traffic, low latency traffic, low jitter traffic, and other types of classifications. Such bits can also be set for a specific application such as Voice over IP. Based on the classification of the traffic it can be routed to one of several virtual routers (VRFs) using simple policy 245 as it enters egress router 246. Each VRF routing table 247, 248 and 249 are structured to meet the specific application requirements of the traffic, which may or may not be the same as the other classes of traffic. Thus, a network becomes "application-aware" when routing decisions are made according to the present invention.

In a specific embodiment, the ingress traffic is received and classified, according to application or application class, as determined by a service level manager 580 including a passive flow analyzer configured to use a router or a switch. An example of the present invention will classify traffic at the network edge by setting the IP ToS or DSCP bits in the IP header. The passive flow analyzer is able to read, interpret, and classify this field which allows a different service level check per classification. Likewise, the system can maintain separate virtual routers (VRF) for each classification that can override default routing behavior.

Therefore, an AS implementing the present invention will maintain a low latency routing table, a low loss routing table, and a low jitter routing table. The routing tables are distinct since the best route to a destination in the low loss table may have a different next hop than the best route in the low loss table. Once the traffic is classified, it is sent to the proper virtual router using 802.1q trunks or other policy routing mechanisms. The traffic is then forwarded based on the proper virtual routing table. Although only one traffic classification engine 243 and one service level manager 580 is shown providing separate virtual routers for each classification, a preferred embodiment uses one traffic classification engine 243 and one service level manager 580 for each traffic classification type. For example, three separate engines 243 and managers 580 are associated with resolving each of network jitter, network loss, and network latency.

Such classification is necessary because different classes of traffic have different requirements that the network must meet. For instance, real time traffic such as Voice over IP or streaming media demands strict attention to network jitter and less attention to packet loss or latency below certain minimums, which are generally attainable in the Internet today. Transaction or encrypted traffic may demand strict attention to packet loss whereas normal TCP traffic may require that the network minimize latency to increase throughput. Thus, the passive flow analyzer according to the present invention performs traffic classification to facilitate "application-aware" routing.

An exemplary controller is configured to receive information regarding the nature of a service level violation, such as the classification of traffic that is failing to meet the minimum levels. Based on this information, the controller is able to analyze the stats output from this perspective and make a classification-based decision and subsequent change to the proper virtual routing table.

Although the present invention has been discussed with respect to specific embodiments, one of ordinary skill in the art will realize that these embodiments are merely illustrative, and not restrictive, of the invention. For example, although the above description describes the network communication data as Internet traffic, it should be understood that the present invention relates to networks in general and need not be restricted to Internet data. The scope of the invention is to be determined by the appended claims.

What is claimed is:

1. A system for maintaining a traffic service level of a traffic flow in which the traffic flows to and flows from a computer network having a source, the computer network coupled to at least one of a plurality of networks, each of the networks includes a plurality of paths for transporting the traffic to a destination, where at least two of the networks are electrically coupled at an interconnection point and where the traffic flows through the interconnection point, the system comprising:
   a passive flow analyzer configured to receive the traffic flow;
   a calibrator configured to actively probe one or more alternative paths to the destination to determine a subset of alternative paths;
   a traffic flow repository coupled between the passive flow analyzer and the calibrator to store information regarding the alternative paths and the traffic flow;
   a controller coupled between the passive flow analyzer and the calibrator;
   an optimizer coupled to the traffic flow repository to determine optimized ingress paths;
   a modulator coupled between the optimizer and the controller to generate a modified routing table; and
   a router to route the traffic flow according to the modified routing table,
   wherein the modified routing table includes a changed source address where the changed source address is associated with an optimized ingress path from the destination and an alternate path to the destination.

2. A system for maintaining a traffic service level over at least two of the networks electrically coupled at an interconnection point, where traffic flows through the interconnection point, by changing default routing tables of a plurality of regional networks, where a first regional network includes a first region router coupled to a first region route server, and a second regional network includes a second region router coupled to a second region route server, the system comprising:
   a first region passive flow analyzer configured to receive the traffic flow from the first region;
   a second region passive flow analyzer configured to receive the traffic flow from the second region;
   a first region calibrator configured to actively probe one or more alternative paths to the destination to determine a first subset of alternative paths;
   a second region calibrator configured to actively probe one or more alternative paths to the destination to determine a second subset of alternative paths;
   a central traffic flow repository coupled between the first region passive flow analyzer, the second region passive flow analyzer, the first region calibrator and the second calibrator to store information regarding the first subset and the second subset of alternative paths and the first region and the second region traffic flow; and
   a central route server coupled between the central traffic flow repository and
   the first region route server and the second region route server to receive a first region routing table and a second region routing table, respectively,
   wherein, the central route server provides the first route server with a first modified routing table and provides the second route server with a second modified routing table.

3. The system of claim 2, wherein the central route server is coupled to a second central route server.

4. The system of claim 2, wherein the central route server is coupled to a parent central route server, wherein the parent central route server is further coupled to one or more central router servers where each of the one or more central router servers are associated with one or more regions.

5. The system of claim 4, wherein the parent central route server provides the first central route server with a first central modified routing table and provides the one or more central route servers with one or more central modified routing tables.

6. The system of claim 2, further comprising a first region traffic flow repository coupled to the first region passive flow analyzer to store information regarding the alternative paths and the traffic flow of the first region; and
   a second region traffic flow repository coupled to the second region passive flow analyzer to store information regarding the alternative paths and the traffic flow of the second region.

7. A system for maintaining a traffic service level over at least two of the networks electrically coupled at an interconnection point, where traffic flows through the interconnection point, by changing default routing tables of a plurality of regional networks,
   where a first regional network includes a first region router coupled to a first region route server, and a second regional network includes a second region router coupled to a second region route server, the system comprising:
   a first region passive flow analyzer configured to receive the traffic flow from the first region;
   a second region passive flow analyzer configured to receive the traffic flow from the second region;
   a first region calibrator configured to actively probe one or more alternative paths to the destination to determine a first subset of alternative paths;
   a second region calibrator configured to actively probe one or more alternative paths to the destination to determine a second subset of alternative paths;
   a first region calibrator repository coupled to the first calibrator to store information regarding the alternative of the first region;
   a second region calibrator repository coupled to the second calibrator to store information regarding the alternative of the second region;

a first region controller coupled between the first region calibrator repository and the first region passive flow analyzer, the first region controller further coupled to the first region route server to advertise a first region metric to other regions; and a second region controller coupled between the second region calibrator repository and the second region passive flow analyzer, the second region controller further coupled to the second region route server to advertise a second region metric to other regions, wherein the first region route server and the second region route server are coupled to resolve a service level violation from either region.

8. A method for maintaining a traffic service level of a traffic flow in which the traffic flows from a source to a destination though a plurality of networks, comprising:

analyzing the traffic flow using a passive flow analyzer;

actively probing one or more alternative paths to the destination to determine a subset of alternate paths;

storing information regarding the alternative paths and the traffic flow;

determining optimized ingress paths based on the stored information;

modifying a routing table to include a changed source address, wherein the changed source address is associated with an optimized ingress path from the destination and an alternate path to the destination; and routing the traffic flow according to the modified routing table.

9. The method of claim 8, wherein actively probing one or more alternate paths comprises obtaining information about the network latency of the one or more alternate paths from the source to the destination.

10. The method of claim 8, wherein actively probing one or more alternate paths comprises obtaining information about the network loss of the one or more alternate paths from the source to the destination.

11. The method of claim 8, wherein actively probing one or more alternate paths comprises obtaining information about network jitter of the one or more alternate paths from the source to the destination.

12. The method of claim 8, wherein actively probing one or more alternate paths comprises transmitting a probe along the one or more alternate paths, the probe comprising one of a Sting probe, a lightweight TCP-based probe, and a traceroute probe.

13. A method for maintaining a traffic service level for a traffic flow in which the traffic flows from a source to a destination through a plurality of networks, wherein at least two of the networks are electrically coupled at an interconnection point, comprising:

passively monitoring the traffic flow at a single point along a first path to the destination to determine data flow characteristics of the first path;

actively probing a second path to the destination to determine traffic flow characteristics of the second path;

comparing the traffic flow characteristics of the first path to traffic flow characteristics of the second path to determine an optimized path;

providing a changed source address, wherein the changed source address is associated with an optimized ingress path from the destination; and routing the traffic flow along the optimized path.

14. The method of claim 13, further comprising:

comparing the traffic flow characteristics of the first path to one or more performance metrics to determine whether the traffic flow characteristics of the first path satisfy the performance metrics; and indicating a service level violation when the traffic flow characteristics of the first path fail at least one of the performance metrics.

15. The method of claim 13, wherein the changed source address is further associated with an alternate path to the destination.

16. A method for maintaining a traffic service level for a traffic flow in which the traffic flows from a source to a destination through a plurality of networks, wherein at least two of the networks are electrically coupled at an interconnection point, comprising:

passively monitoring the traffic flow at a single point along a first path to the destination to determine data flow characteristics of the first path;

actively probing a second path to the destination to determine traffic flow characteristics of the second path;

comparing the traffic flow characteristics of the first path to traffic flow characteristics of the second path to determine an optimized path;

providing a changed source address, wherein the changed source address is associated with an alternate path to the destination; and routing the traffic flow along the optimized path.

17. The method of claim 16, further comprising:

comparing the traffic flow characteristics of the first path to one or more performance metrics to determine whether the traffic flow characteristics of the first path satisfy the performance metrics; and indicating a service level violation when the traffic flow characteristics of the first path fail at least one of the performance metrics.

18. The method of claim 16, wherein the changed source address is further associated with an optimized ingress path from the destination.

* * * * *